US011633785B2

(12) United States Patent
Badwe et al.

(10) Patent No.: US 11,633,785 B2
(45) Date of Patent: *Apr. 25, 2023

(54) MECHANICALLY ALLOYED POWDER FEEDSTOCK

(71) Applicant: 6K Inc., North Andover, MA (US)

(72) Inventors: Sunil Bhalchandra Badwe, Export, PA (US); Makhlouf Redjdal, Melrose, MA (US); Scott Joseph Turchetti, Newburyport, MA (US)

(73) Assignee: 6K Inc., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,118

(22) Filed: Mar. 23, 2022

(65) Prior Publication Data

US 2022/0288685 A1    Sep. 15, 2022

Related U.S. Application Data

(63) Continuation of application No. 16/861,594, filed on Apr. 29, 2020, now Pat. No. 11,311,938.

(60) Provisional application No. 62/840,607, filed on Apr. 30, 2019.

(51) Int. Cl.
| | | |
|---|---|---|
| *B22F 9/14* | (2006.01) | |
| *B22F 9/04* | (2006.01) | |
| *C22C 1/04* | (2023.01) | |
| *B22F 1/065* | (2022.01) | |

(52) U.S. Cl.
CPC ............... *B22F 9/04* (2013.01); *B22F 1/065* (2022.01); *B22F 9/14* (2013.01); *C22C 1/04* (2013.01); *B22F 2009/043* (2013.01); *B22F 2301/052* (2013.01); *B22F 2301/205* (2013.01); *B22F 2301/35* (2013.01)

(58) Field of Classification Search
None
See application file for complete search history.

(56) References Cited

U.S. PATENT DOCUMENTS

| | | |
|---|---|---|
| 1,699,205 A | 1/1929 | Emil et al. |
| 2,892,215 A | 6/1959 | Gerhard et al. |
| 3,290,723 A | 12/1966 | John et al. |

(Continued)

FOREIGN PATENT DOCUMENTS

| | | |
|---|---|---|
| AU | 2003211869 A1 | 9/2003 |
| AU | 2014394102 B2 | 6/2020 |

(Continued)

OTHER PUBLICATIONS

English translation of CN 103121105 (originally published May 29, 2013) obtained from Espacenet.*

(Continued)

*Primary Examiner* — George Wyszomierski
(74) *Attorney, Agent, or Firm* — Knobbe, Martens, Olson & Bear, LLP

(57) ABSTRACT

Disclosed herein are embodiments of mechanically alloyed powder feedstock and methods for spheroidizing them using microwave plasma processing. The spheroidized powder can be used in metal injection molding processes, hot isostatic processing, and additive manufacturing. In some embodiments, mechanical milling, such as ball milling, can be used to prepare high entropy alloys for microwave plasma processing.

20 Claims, 7 Drawing Sheets

(56) References Cited

U.S. PATENT DOCUMENTS

| | | | |
|---|---|---|---|
| 3,293,334 A | 12/1966 | Bylund et al. |
| 3,434,831 A | 3/1969 | Knopp |
| 3,466,165 A | 9/1969 | Rhys et al. |
| RE26,879 E | 5/1970 | Kelso |
| 3,652,259 A | 3/1972 | Knopp |
| 3,802,816 A | 4/1974 | Kaufmann |
| 3,845,344 A | 10/1974 | Rainer |
| 3,909,241 A | 9/1975 | Cheney et al. |
| 3,966,374 A | 6/1976 | Honnorat et al. |
| 3,974,245 A | 8/1976 | Cheney et al. |
| 4,076,640 A | 2/1978 | Forgensi et al. |
| 4,177,026 A | 12/1979 | Honnorat et al. |
| 4,212,837 A | 7/1980 | Kubo et al. |
| 4,221,554 A | 9/1980 | Oguchi et al. |
| 4,221,775 A | 9/1980 | Anno |
| 4,423,303 A | 12/1983 | Hirose et al. |
| 4,431,449 A | 2/1984 | Dillon et al. |
| 4,439,410 A | 3/1984 | Santen et al. |
| 4,544,404 A | 10/1985 | Yolton et al. |
| 4,569,823 A | 2/1986 | Westin |
| 4,599,880 A | 7/1986 | Stepanenko et al. |
| 4,611,108 A | 9/1986 | Leprince et al. |
| 4,670,047 A | 6/1987 | Kopatz et al. |
| 4,692,584 A | 9/1987 | Caneer |
| 4,705,560 A | 11/1987 | Kemp et al. |
| 4,711,660 A | 12/1987 | Kemp et al. |
| 4,711,661 A | 12/1987 | Kemp et al. |
| 4,714,587 A | 12/1987 | Eylon et al. |
| 4,731,110 A | 3/1988 | Kopatz et al. |
| 4,731,111 A | 3/1988 | Kopatz et al. |
| 4,772,315 A | 9/1988 | Johnson et al. |
| 4,778,515 A | 10/1988 | Kemp et al. |
| 4,780,131 A | 10/1988 | Kemp et al. |
| 4,783,216 A | 11/1988 | Kemp et al. |
| 4,783,218 A | 11/1988 | Kemp et al. |
| 4,787,934 A | 11/1988 | Johnson et al. |
| 4,802,915 A | 2/1989 | Kopatz et al. |
| 4,836,850 A | 6/1989 | Kemp et al. |
| 4,859,237 A | 8/1989 | Johnson et al. |
| 4,923,509 A | 5/1990 | Kemp et al. |
| 4,943,322 A | 7/1990 | Kemp et al. |
| 4,944,797 A | 7/1990 | Kemp et al. |
| 4,952,389 A | 8/1990 | Szymanski et al. |
| 5,041,713 A | 8/1991 | Weidman |
| 5,095,048 A | 3/1992 | Takahashi et al. |
| 5,114,471 A | 5/1992 | Johnson et al. |
| 5,131,992 A | 7/1992 | Church et al. |
| 5,200,595 A | 4/1993 | Boulos et al. |
| 5,290,507 A | 3/1994 | Runkle |
| 5,292,370 A | 3/1994 | Tsai et al. |
| 5,376,475 A | 12/1994 | Ovshinsky et al. |
| 5,411,592 A | 5/1995 | Ovshinsky et al. |
| 5,431,967 A | 7/1995 | Manthiram et al. |
| 5,518,831 A | 5/1996 | Tou et al. |
| 5,676,919 A | 10/1997 | Kawamura et al. |
| 5,750,013 A | 5/1998 | Lin |
| 5,776,323 A | 7/1998 | Kobashi |
| 5,958,361 A | 9/1999 | Laine et al. |
| 5,980,977 A | 11/1999 | Deng et al. |
| 5,989,648 A | 11/1999 | Phillips |
| 6,221,125 B1 | 4/2001 | Soda et al. |
| 6,261,484 B1 | 7/2001 | Phillips et al. |
| 6,274,110 B1 | 8/2001 | Kim et al. |
| 6,329,628 B1 | 12/2001 | Kuo et al. |
| 6,334,882 B1 | 1/2002 | Aaslund |
| 6,376,027 B1 | 4/2002 | Lee et al. |
| 6,409,851 B1 | 6/2002 | Sethuram et al. |
| 6,428,600 B1 | 8/2002 | Flurschuetz et al. |
| 6,543,380 B1 | 4/2003 | Sung-Spitzl |
| 6,551,377 B1 | 4/2003 | Leonhardt |
| 6,569,397 B1 | 5/2003 | Yadav et al. |
| 6,579,573 B2 | 6/2003 | Strutt et al. |
| 6,589,311 B1 | 7/2003 | Han et al. |
| 6,652,822 B2 | 11/2003 | Phillips et al. |
| 6,676,728 B2 | 1/2004 | Han et al. |
| 6,689,192 B1 | 2/2004 | Phillips et al. |
| 6,752,979 B1 | 6/2004 | Talbot et al. |
| 6,755,886 B2 | 6/2004 | Phillips et al. |
| 6,780,219 B2 | 8/2004 | Singh et al. |
| 6,793,849 B1 | 9/2004 | Gruen et al. |
| 6,805,822 B2 | 10/2004 | Takei et al. |
| 6,838,072 B1 | 1/2005 | Kong et al. |
| 6,869,550 B2 | 3/2005 | Dorfman et al. |
| 6,902,745 B2 | 6/2005 | Lee et al. |
| 6,919,257 B2 | 7/2005 | Gealy et al. |
| 6,919,527 B2 | 7/2005 | Boulos et al. |
| 6,989,529 B2 | 1/2006 | Wiseman |
| 7,066,980 B2 | 6/2006 | Akimoto et al. |
| 7,091,441 B1 | 8/2006 | Kuo |
| 7,108,733 B2 | 9/2006 | Enokido |
| 7,125,537 B2 | 10/2006 | Liao et al. |
| 7,125,822 B2 | 10/2006 | Nakano et al. |
| 7,175,786 B2 | 2/2007 | Celikkaya et al. |
| 7,182,929 B1 | 2/2007 | Singhal et al. |
| 7,220,398 B2 | 5/2007 | Sutorik et al. |
| 7,235,118 B2 | 6/2007 | Bouaricha et al. |
| 7,285,194 B2 | 10/2007 | Uno et al. |
| 7,285,307 B2 | 10/2007 | Hohenthanner et al. |
| 7,297,310 B1 | 11/2007 | Peng et al. |
| 7,297,892 B2 | 11/2007 | Kelley et al. |
| 7,344,776 B2 | 3/2008 | Kollmann et al. |
| 7,357,910 B2 | 4/2008 | Phillips et al. |
| 7,368,130 B2 | 5/2008 | Kim et al. |
| 7,374,704 B2 | 5/2008 | Che et al. |
| 7,375,303 B2 | 5/2008 | Twarog |
| 7,431,750 B2 | 10/2008 | Liao et al. |
| 7,442,271 B2 | 10/2008 | Asmussen et al. |
| 7,491,468 B2 | 2/2009 | Okada et al. |
| 7,517,513 B2 | 4/2009 | Sarkas et al. |
| 7,524,353 B2 | 4/2009 | Johnson et al. |
| 7,534,296 B2 | 5/2009 | Swain et al. |
| 7,572,315 B2 | 8/2009 | Boulos et al. |
| 7,622,211 B2 | 11/2009 | Vyas et al. |
| 7,629,553 B2 | 12/2009 | Fanson et al. |
| 7,700,152 B2 | 4/2010 | Laine et al. |
| 7,776,303 B2 | 8/2010 | Hung et al. |
| 7,806,077 B2 | 10/2010 | Lee et al. |
| 7,828,999 B2 | 11/2010 | Yubuta et al. |
| 7,901,658 B2 | 3/2011 | Weppner et al. |
| 7,931,836 B2 | 4/2011 | Xie et al. |
| 7,939,141 B2 | 5/2011 | Matthews et al. |
| 8,007,691 B2 | 8/2011 | Sawaki et al. |
| 8,043,405 B2 | 10/2011 | Johnson et al. |
| 8,092,941 B2 | 1/2012 | Weppner et al. |
| 8,101,061 B2 | 1/2012 | Suh et al. |
| 8,168,128 B2 | 5/2012 | Seeley et al. |
| 8,178,240 B2 | 5/2012 | Wang et al. |
| 8,192,865 B2 | 6/2012 | Buiel et al. |
| 8,193,291 B2 | 6/2012 | Zhang |
| 8,211,388 B2 | 7/2012 | Woodfield et al. |
| 8,268,230 B2 | 9/2012 | Cherepy et al. |
| 8,283,275 B2 | 10/2012 | Heo et al. |
| 8,303,926 B1 | 11/2012 | Luhrs et al. |
| 8,329,090 B2 | 12/2012 | Hollingsworth et al. |
| 8,329,257 B2 | 12/2012 | Larouche et al. |
| 8,338,323 B2 | 12/2012 | Takasu et al. |
| 8,389,160 B2 | 3/2013 | Venkatachalam et al. |
| 8,420,043 B2 | 4/2013 | Gamo et al. |
| 8,439,998 B2 | 5/2013 | Ito et al. |
| 8,449,950 B2 | 5/2013 | Shang et al. |
| 8,478,785 B2 | 7/2013 | Jamjoom et al. |
| 8,492,303 B2 | 7/2013 | Bulan et al. |
| 8,529,996 B2 | 9/2013 | Bocian et al. |
| 8,592,767 B2 | 11/2013 | Rappe et al. |
| 8,597,722 B2 | 12/2013 | Albano et al. |
| 8,623,555 B2 | 1/2014 | Kang et al. |
| 8,658,317 B2 | 2/2014 | Weppner et al. |
| 8,685,593 B2 | 4/2014 | Dadheech et al. |
| 8,728,680 B2 | 5/2014 | Mikhail et al. |
| 8,735,022 B2 | 5/2014 | Schlag et al. |
| 8,748,785 B2 | 6/2014 | Jordan et al. |
| 8,758,957 B2 | 6/2014 | Dadheech et al. |
| 8,784,706 B2 | 7/2014 | Shevchenko et al. |
| 8,822,000 B2 | 9/2014 | Kumagai et al. |

(56) References Cited

U.S. PATENT DOCUMENTS

| | | |
|---|---|---|
| 8,840,701 B2 | 9/2014 | Borland et al. |
| 8,877,119 B2 | 11/2014 | Jordan et al. |
| 8,911,529 B2 | 12/2014 | Withers et al. |
| 8,919,428 B2 | 12/2014 | Cola et al. |
| 8,945,431 B2 | 2/2015 | Schulz et al. |
| 8,951,496 B2 | 2/2015 | Hadidi et al. |
| 8,956,785 B2 | 2/2015 | Dadheech et al. |
| 8,968,587 B2 | 3/2015 | Shin et al. |
| 8,968,669 B2 | 3/2015 | Chen |
| 8,980,485 B2 | 3/2015 | Lanning et al. |
| 8,999,440 B2 | 4/2015 | Zenasni et al. |
| 9,023,259 B2 | 5/2015 | Hadidi et al. |
| 9,065,141 B2 | 6/2015 | Merzougui et al. |
| 9,067,264 B2 | 6/2015 | Moxson et al. |
| 9,079,778 B2 | 7/2015 | Kelley et al. |
| 9,085,490 B2 | 7/2015 | Taylor et al. |
| 9,101,982 B2 | 8/2015 | Aslund |
| 9,136,569 B2 | 9/2015 | Song et al. |
| 9,150,422 B2 | 10/2015 | Nakayama et al. |
| 9,193,133 B2 | 11/2015 | Shin et al. |
| 9,196,901 B2 | 11/2015 | Se-Hee et al. |
| 9,196,905 B2 | 11/2015 | Tzeng et al. |
| 9,206,085 B2 | 12/2015 | Hadidi et al. |
| 9,242,224 B2 | 1/2016 | Redjdal et al. |
| 9,259,785 B2 | 2/2016 | Hadidi et al. |
| 9,321,071 B2 | 4/2016 | Jordan et al. |
| 9,322,081 B2 | 4/2016 | Mchugh et al. |
| 9,352,278 B2 | 5/2016 | Spatz et al. |
| 9,356,281 B2 | 5/2016 | Verbrugge et al. |
| 9,368,772 B1 | 6/2016 | Chen et al. |
| 9,412,998 B2 | 8/2016 | Rojeski et al. |
| 9,421,612 B2 | 8/2016 | Fang et al. |
| 9,425,463 B2 | 8/2016 | Hsu et al. |
| 9,463,435 B2 | 10/2016 | Schulz et al. |
| 9,520,600 B2 | 12/2016 | Dadheech et al. |
| 9,624,565 B2 | 4/2017 | Lee et al. |
| 9,630,162 B1 | 4/2017 | Sunkara et al. |
| 9,643,891 B2 | 5/2017 | Hadidi et al. |
| 9,700,877 B2 | 7/2017 | Kim et al. |
| 9,705,136 B2 | 7/2017 | Rojeski |
| 9,718,131 B2 | 8/2017 | Boulos et al. |
| 9,735,427 B2 | 8/2017 | Zhang |
| 9,751,129 B2 | 9/2017 | Boulos et al. |
| 9,768,033 B2 | 9/2017 | Ranjan et al. |
| 9,776,378 B2 | 10/2017 | Choi |
| 9,782,791 B2 | 10/2017 | Redjdal et al. |
| 9,782,828 B2 | 10/2017 | Wilkinson |
| 9,796,019 B2 | 10/2017 | She et al. |
| 9,796,020 B2 | 10/2017 | Aslund |
| 9,831,503 B2 | 11/2017 | Sopchak |
| 9,871,248 B2 | 1/2018 | Rayner et al. |
| 9,879,344 B2 | 1/2018 | Lee et al. |
| 9,899,674 B2 | 2/2018 | Hirai et al. |
| 9,917,299 B2 | 3/2018 | Behan et al. |
| 9,932,673 B2 | 4/2018 | Jordan et al. |
| 9,945,034 B2 | 4/2018 | Yao et al. |
| 9,947,926 B2 | 4/2018 | Kim et al. |
| 9,981,284 B2 | 5/2018 | Guo et al. |
| 9,991,458 B2 | 6/2018 | Rosenman et al. |
| 9,999,922 B1 | 6/2018 | Struve |
| 10,011,491 B2 | 7/2018 | Lee et al. |
| 10,050,303 B2 | 8/2018 | Anandan et al. |
| 10,057,986 B2 | 8/2018 | Prud'Homme et al. |
| 10,065,240 B2 | 9/2018 | Chen |
| 10,079,392 B2 | 9/2018 | Huang et al. |
| 10,116,000 B1 | 10/2018 | Federici et al. |
| 10,130,994 B2 | 11/2018 | Fang et al. |
| 10,167,556 B2 | 1/2019 | Ruzic et al. |
| 10,170,753 B2 | 1/2019 | Ren et al. |
| 10,193,142 B2 | 1/2019 | Rojeski |
| 10,244,614 B2 | 3/2019 | Foret |
| 10,319,537 B2 | 6/2019 | Claussen et al. |
| 10,333,183 B2 | 6/2019 | Sloop |
| 10,350,680 B2 | 7/2019 | Yamamoto et al. |
| 10,411,253 B2 | 9/2019 | Tzeng et al. |
| 10,439,206 B2 | 10/2019 | Behan et al. |
| 10,442,000 B2 | 10/2019 | Fukada et al. |
| 10,461,298 B2 | 10/2019 | Herle |
| 10,477,665 B2 | 11/2019 | Hadidi et al. |
| 10,493,524 B2 | 12/2019 | She et al. |
| 10,522,300 B2 | 12/2019 | Yang |
| 10,526,684 B2 | 1/2020 | Ekman et al. |
| 10,529,486 B2 | 1/2020 | Nishisaka |
| 10,543,534 B2 | 1/2020 | Hadidi et al. |
| 10,593,985 B2 | 3/2020 | Sastry et al. |
| 10,610,929 B2 | 4/2020 | Fang et al. |
| 10,637,029 B2 | 4/2020 | Gotlib Vainshtein et al. |
| 10,638,592 B2 | 4/2020 | Foret |
| 10,639,712 B2 | 5/2020 | Barnes et al. |
| 10,647,824 B2 | 5/2020 | Hwang et al. |
| 10,655,206 B2 | 5/2020 | Moon et al. |
| 10,665,890 B2 | 5/2020 | Kang et al. |
| 10,668,566 B2 | 6/2020 | Smathers et al. |
| 10,669,437 B2 | 6/2020 | Cox et al. |
| 10,688,564 B2 | 6/2020 | Boulos et al. |
| 10,707,477 B2 | 7/2020 | Sastry et al. |
| 10,717,150 B2 | 7/2020 | Aleksandrov et al. |
| 10,727,477 B2 | 7/2020 | Kim et al. |
| 10,741,845 B2 | 8/2020 | Yushin et al. |
| 10,744,590 B2 | 8/2020 | Maier et al. |
| 10,756,334 B2 | 8/2020 | Stowell et al. |
| 10,766,787 B1 | 9/2020 | Sunkara et al. |
| 10,777,804 B2 | 9/2020 | Sastry et al. |
| 10,892,477 B2 | 1/2021 | Choi et al. |
| 10,943,744 B2 | 3/2021 | Sungail et al. |
| 10,944,093 B2 | 3/2021 | Paz et al. |
| 10,964,938 B2 | 3/2021 | Rojeski |
| 10,987,735 B2 | 4/2021 | Hadidi et al. |
| 10,998,552 B2 | 5/2021 | Lanning et al. |
| 11,031,641 B2 | 6/2021 | Gupta et al. |
| 11,050,061 B2 | 6/2021 | Kim et al. |
| 11,072,533 B2 | 7/2021 | Shevchenko et al. |
| 11,077,524 B2 | 8/2021 | Smathers et al. |
| 11,108,050 B2 | 8/2021 | Kim et al. |
| 11,116,000 B2 | 9/2021 | Sandberg et al. |
| 11,130,175 B2 | 9/2021 | Parrish et al. |
| 11,130,994 B2 | 9/2021 | Shachar et al. |
| 11,133,495 B2 | 9/2021 | Gazda et al. |
| 11,148,202 B2 | 10/2021 | Hadidi et al. |
| 11,167,556 B2 | 11/2021 | Shimada et al. |
| 11,170,753 B2 | 11/2021 | Nomura et al. |
| 11,171,322 B2 | 11/2021 | Seol et al. |
| 11,183,682 B2 | 11/2021 | Sunkara et al. |
| 11,193,142 B2 | 12/2021 | Angelidaki et al. |
| 11,196,045 B2 | 12/2021 | Dadheech et al. |
| 11,219,884 B2 | 1/2022 | Takeda et al. |
| 11,244,614 B2 | 2/2022 | He et al. |
| 11,245,065 B1 | 2/2022 | Ouderkirk et al. |
| 11,245,109 B2 | 2/2022 | Tzeng et al. |
| 11,254,585 B2 | 2/2022 | Ekman et al. |
| 11,273,322 B2 | 3/2022 | Zanata et al. |
| 11,273,491 B2 | 3/2022 | Barnes et al. |
| 11,299,397 B2 | 4/2022 | Lanning et al. |
| 11,311,938 B2 * | 4/2022 | Badwe ............... C22C 33/0207 |
| 11,319,537 B2 | 5/2022 | Dames et al. |
| 11,333,183 B2 | 5/2022 | Desai et al. |
| 11,335,911 B2 | 5/2022 | Lanning et al. |
| 11,350,680 B2 | 6/2022 | Rutkoski et al. |
| 11,411,253 B2 | 8/2022 | Busacca et al. |
| 11,439,206 B2 | 9/2022 | Santos |
| 11,442,000 B2 | 9/2022 | Vaez-Iravani et al. |
| 11,461,298 B1 | 10/2022 | Shemmer et al. |
| 11,465,201 B2 | 10/2022 | Barnes et al. |
| 11,471,941 B2 | 10/2022 | Barnes et al. |
| 11,477,665 B2 | 10/2022 | Franke et al. |
| 2001/0016283 A1 | 8/2001 | Shiraishi et al. |
| 2002/0112794 A1 | 8/2002 | Sethuram et al. |
| 2003/0027021 A1 | 2/2003 | Sharivker et al. |
| 2003/0129497 A1 | 7/2003 | Yamamoto et al. |
| 2003/0172772 A1 | 9/2003 | Sethuram et al. |
| 2003/0186128 A1 | 10/2003 | Singh et al. |
| 2003/0207978 A1 | 11/2003 | Yadav et al. |
| 2004/0013941 A1 | 1/2004 | Kobayashi et al. |
| 2004/0045807 A1 | 3/2004 | Sarkas et al. |

(56) References Cited

U.S. PATENT DOCUMENTS

| | | |
|---|---|---|
| 2004/0060387 A1 | 4/2004 | Tanner-Jones |
| 2004/0123699 A1 | 7/2004 | Liao et al. |
| 2005/0025698 A1 | 2/2005 | Talbot et al. |
| 2005/0163696 A1 | 7/2005 | Uhm et al. |
| 2005/0242070 A1 | 11/2005 | Hammer |
| 2005/0260786 A1 | 11/2005 | Yoshikawa et al. |
| 2006/0040168 A1 | 2/2006 | Sridhar |
| 2006/0141153 A1 | 6/2006 | Kubota et al. |
| 2006/0145124 A1 | 7/2006 | Hsiao et al. |
| 2006/0291827 A1 | 12/2006 | Suib et al. |
| 2007/0077350 A1 | 4/2007 | Hohenthanner et al. |
| 2007/0089860 A1 | 4/2007 | Hou et al. |
| 2007/0209758 A1 | 9/2007 | Sompalli et al. |
| 2007/0259768 A1 | 11/2007 | Kear et al. |
| 2008/0029485 A1 | 2/2008 | Kelley et al. |
| 2008/0182114 A1 | 7/2008 | Kim et al. |
| 2008/0220244 A1 | 9/2008 | Wai et al. |
| 2008/0286490 A1 | 11/2008 | Bogdanoff et al. |
| 2008/0296268 A1 | 12/2008 | Mike et al. |
| 2008/0305025 A1 | 12/2008 | Vitner et al. |
| 2009/0074655 A1 | 3/2009 | Suciu |
| 2009/0093553 A1 | 4/2009 | Kleine et al. |
| 2009/0155689 A1 | 6/2009 | Zaghib et al. |
| 2009/0202869 A1 | 8/2009 | Sawaki et al. |
| 2009/0258255 A1 | 10/2009 | Terashima et al. |
| 2009/0305132 A1 | 12/2009 | Gauthier et al. |
| 2010/0007162 A1 | 1/2010 | Han et al. |
| 2010/0096362 A1 | 4/2010 | Hirayama et al. |
| 2010/0176524 A1 | 7/2010 | Burgess et al. |
| 2011/0006254 A1 | 1/2011 | Richard et al. |
| 2012/0015284 A1 | 1/2012 | Merzougui et al. |
| 2012/0027955 A1 | 2/2012 | Sunkara et al. |
| 2012/0034135 A1 | 2/2012 | Risby |
| 2012/0048064 A1 | 3/2012 | Kasper et al. |
| 2012/0051962 A1 | 3/2012 | Imam et al. |
| 2012/0074342 A1 | 3/2012 | Kim et al. |
| 2012/0100438 A1 | 4/2012 | Fasching et al. |
| 2012/0122017 A1 | 5/2012 | Mills |
| 2012/0230860 A1 | 9/2012 | Ward-Close et al. |
| 2012/0240726 A1 | 9/2012 | Kim et al. |
| 2012/0294919 A1 | 11/2012 | Jaynes et al. |
| 2013/0032753 A1 | 2/2013 | Yamamoto et al. |
| 2013/0071284 A1 | 3/2013 | Kano et al. |
| 2013/0078508 A1 | 3/2013 | Tolbert et al. |
| 2013/0084474 A1 | 4/2013 | Mills |
| 2014/0131906 A1* | 5/2014 | Hadidi ............... B29B 9/16 264/15 |
| 2014/0202286 A1 | 7/2014 | Yokoyama et al. |
| 2014/0272430 A1 | 9/2014 | Kalayaraman |
| 2014/0322632 A1 | 10/2014 | Sugimoto et al. |
| 2014/0373344 A1 | 12/2014 | Takada et al. |
| 2015/0000844 A1 | 1/2015 | Woo |
| 2015/0101454 A1 | 4/2015 | Shimizu et al. |
| 2015/0167143 A1 | 6/2015 | Luce et al. |
| 2015/0171455 A1 | 6/2015 | Mills |
| 2015/0255767 A1 | 9/2015 | Aetukuri et al. |
| 2015/0259220 A1 | 9/2015 | Rosocha et al. |
| 2015/0333307 A1 | 11/2015 | Thokchom et al. |
| 2016/0013486 A1 | 1/2016 | Hirai et al. |
| 2016/0028088 A1 | 1/2016 | Romeo et al. |
| 2016/0152480 A1 | 6/2016 | Jang et al. |
| 2016/0285090 A1 | 9/2016 | Ozkan et al. |
| 2016/0287113 A1 | 10/2016 | Hebert et al. |
| 2016/0308244 A1 | 10/2016 | Badding et al. |
| 2016/0332232 A1 | 11/2016 | Forbes et al. |
| 2016/0351910 A1 | 12/2016 | Albano et al. |
| 2017/0009328 A1 | 1/2017 | Germann et al. |
| 2017/0070180 A1 | 3/2017 | Mills |
| 2017/0120339 A1 | 5/2017 | Aslund |
| 2017/0125842 A1 | 5/2017 | Meguro et al. |
| 2017/0151609 A1 | 6/2017 | Elsen et al. |
| 2017/0176977 A1 | 6/2017 | Huang et al. |
| 2017/0179477 A1 | 6/2017 | Walters et al. |
| 2017/0368604 A1 | 12/2017 | Wilkinson |
| 2017/0373344 A1 | 12/2017 | Hadidi et al. |
| 2018/0083264 A1 | 3/2018 | Soppe |
| 2018/0104745 A1 | 4/2018 | L'Esperance et al. |
| 2018/0159178 A1 | 6/2018 | Weisenstein et al. |
| 2018/0214956 A1 | 8/2018 | Larouche et al. |
| 2018/0241956 A1 | 8/2018 | Suzuki |
| 2018/0248175 A1 | 8/2018 | Ghezelbash et al. |
| 2018/0277849 A1 | 9/2018 | Gayden |
| 2018/0366707 A1 | 12/2018 | Johnson et al. |
| 2019/0001416 A1 | 1/2019 | Larouche et al. |
| 2019/0061005 A1 | 2/2019 | Kelkar |
| 2019/0084290 A1 | 3/2019 | Stoyanov et al. |
| 2019/0125842 A1 | 5/2019 | Grabowski |
| 2019/0127835 A1 | 5/2019 | Yang et al. |
| 2019/0160528 A1 | 5/2019 | Mcgee et al. |
| 2019/0165413 A1 | 5/2019 | Furusawa |
| 2019/0173130 A1 | 6/2019 | Schuhmacher et al. |
| 2019/0218650 A1 | 7/2019 | Subramanian et al. |
| 2019/0271068 A1 | 9/2019 | Sungail et al. |
| 2019/0292441 A1 | 9/2019 | Hill et al. |
| 2019/0334206 A1 | 10/2019 | Sastry et al. |
| 2019/0341650 A9 | 11/2019 | Lanning et al. |
| 2019/0348202 A1 | 11/2019 | Sachdev et al. |
| 2019/0362936 A1 | 11/2019 | Van Den Berg et al. |
| 2020/0067128 A1 | 2/2020 | Chmiola et al. |
| 2020/0153037 A1 | 5/2020 | Renna et al. |
| 2020/0198977 A1 | 6/2020 | Hof et al. |
| 2020/0203706 A1 | 6/2020 | Holman et al. |
| 2020/0207668 A1 | 7/2020 | Cavalli et al. |
| 2020/0223704 A1 | 7/2020 | Neale et al. |
| 2020/0227728 A1 | 7/2020 | Huang et al. |
| 2020/0254432 A1 | 8/2020 | Shirman et al. |
| 2020/0276638 A1 | 9/2020 | King et al. |
| 2020/0288561 A1 | 9/2020 | Huh |
| 2020/0314991 A1 | 10/2020 | Duanmu et al. |
| 2020/0335754 A1 | 10/2020 | Ramasubramanian et al. |
| 2020/0335781 A1 | 10/2020 | Oshita et al. |
| 2020/0346287 A1 | 11/2020 | Badwe et al. |
| 2020/0350542 A1 | 11/2020 | Wrobel et al. |
| 2020/0350565 A1 | 11/2020 | Oshita et al. |
| 2020/0358093 A1 | 11/2020 | Oshita et al. |
| 2020/0358096 A1 | 11/2020 | Paulsen et al. |
| 2020/0388857 A1 | 12/2020 | Sunkara et al. |
| 2020/0391295 A1 | 12/2020 | Dorval et al. |
| 2020/0395607 A1 | 12/2020 | Tzeng |
| 2020/0407858 A1 | 12/2020 | Sano et al. |
| 2021/0047186 A1 | 2/2021 | Ifuku et al. |
| 2021/0075000 A1 | 3/2021 | Holman et al. |
| 2021/0078072 A1 | 3/2021 | Barnes et al. |
| 2021/0085468 A1 | 3/2021 | Ryd et al. |
| 2021/0129216 A1 | 5/2021 | Barnes et al. |
| 2021/0139331 A1 | 5/2021 | Kang et al. |
| 2021/0146432 A1 | 5/2021 | Badwe et al. |
| 2021/0187607 A1 | 6/2021 | Badwe et al. |
| 2021/0226302 A1 | 7/2021 | Lanning et al. |
| 2021/0252599 A1 | 8/2021 | Hadidi et al. |
| 2021/0253430 A1 | 8/2021 | Zaplotnik et al. |
| 2021/0273292 A1 | 9/2021 | Yun et al. |
| 2021/0276094 A1 | 9/2021 | Sobu et al. |
| 2021/0296731 A1 | 9/2021 | Wrobel et al. |
| 2021/0310110 A1 | 10/2021 | Stowell et al. |
| 2021/0344059 A1 | 11/2021 | Ekman et al. |
| 2021/0367264 A1 | 11/2021 | Hadidi et al. |
| 2021/0408533 A1 | 12/2021 | Holman et al. |
| 2022/0041457 A1 | 2/2022 | Pullen et al. |
| 2022/0095445 A1 | 3/2022 | Shang et al. |
| 2022/0118517 A1 | 4/2022 | Hadidi et al. |
| 2022/0127145 A1 | 4/2022 | Ding et al. |
| 2022/0134431 A1 | 5/2022 | Badwe et al. |
| 2022/0223379 A1 | 7/2022 | Holman et al. |
| 2022/0228288 A1 | 7/2022 | Holman et al. |
| 2022/0267216 A1 | 8/2022 | Holman et al. |
| 2022/0314325 A1 | 10/2022 | Badwe |
| 2022/0324022 A1 | 10/2022 | Badwe |

FOREIGN PATENT DOCUMENTS

| | | |
|---|---|---|
| CA | 2947531 A1 | 11/2015 |
| CN | 1188073 A | 7/1998 |
| CN | 1653869 A | 8/2005 |

(56) References Cited

FOREIGN PATENT DOCUMENTS

| | | |
|---|---|---|
| CN | 1675785 A | 9/2005 |
| CN | 1967911 A | 5/2007 |
| CN | 101191204 A | 6/2008 |
| CN | 101391307 A | 3/2009 |
| CN | 101728509 A | 6/2010 |
| CN | 101716686 B | 2/2011 |
| CN | 102394290 A | 3/2012 |
| CN | 102412377 A | 4/2012 |
| CN | 102427130 A | 4/2012 |
| CN | 102664273 A | 9/2012 |
| CN | 102723502 A | 10/2012 |
| CN | 102179521 B | 1/2013 |
| CN | 102867940 A | 1/2013 |
| CN | 102983312 A | 3/2013 |
| CN | 103121105 A * | 5/2013 |
| CN | 103402921 A | 11/2013 |
| CN | 102554242 B | 12/2013 |
| CN | 103456926 A | 12/2013 |
| CN | 103682372 A | 3/2014 |
| CN | 103682383 A | 3/2014 |
| CN | 103700815 A | 4/2014 |
| CN | 103874538 A | 6/2014 |
| CN | 103956520 A | 7/2014 |
| CN | 104064736 A | 9/2014 |
| CN | 104084592 A | 10/2014 |
| CN | 104209526 A | 12/2014 |
| CN | 104218213 A | 12/2014 |
| CN | 204156003 U | 2/2015 |
| CN | 104485452 A | 4/2015 |
| CN | 104752734 A | 7/2015 |
| CN | 103515590 B | 9/2015 |
| CN | 105514373 A | 4/2016 |
| CN | 104772473 B | 9/2016 |
| CN | 106159316 A | 11/2016 |
| CN | 106450146 A | 2/2017 |
| CN | 106493350 A | 3/2017 |
| CN | 206040854 U | 3/2017 |
| CN | 106684387 A | 5/2017 |
| CN | 106784692 A | 5/2017 |
| CN | 107093732 A | 8/2017 |
| CN | 107579241 A | 1/2018 |
| CN | 108134104 A | 6/2018 |
| CN | 108217612 A | 6/2018 |
| CN | 108649190 A | 10/2018 |
| CN | 108963239 A | 12/2018 |
| CN | 109167070 A | 1/2019 |
| CN | 109301212 A | 2/2019 |
| CN | 109616622 A | 4/2019 |
| CN | 109742320 A | 5/2019 |
| CN | 109888233 A | 6/2019 |
| CN | 110299516 A | 10/2019 |
| CN | 110790263 A | 2/2020 |
| CN | 110993908 A | 4/2020 |
| CN | 111099577 A | 5/2020 |
| CN | 111342163 A | 6/2020 |
| CN | 111370751 A | 7/2020 |
| CN | 111403701 A | 7/2020 |
| CN | 111970807 A | 11/2020 |
| CN | 112259740 A | 1/2021 |
| CN | 112331947 A | 2/2021 |
| CN | 112397706 A | 2/2021 |
| CN | 112421006 A | 2/2021 |
| CN | 112421048 A | 2/2021 |
| CN | 112447977 A | 3/2021 |
| CN | 112768709 A | 5/2021 |
| CN | 112768710 A | 5/2021 |
| CN | 112768711 A | 5/2021 |
| CN | 112864453 A | 5/2021 |
| CN | 113097487 A | 7/2021 |
| CN | 113104838 A | 7/2021 |
| CN | 113764688 A | 12/2021 |
| CN | 113871581 A | 12/2021 |
| CN | 114388822 A | 4/2022 |
| CN | 114744315 A | 7/2022 |
| CN | 114824297 A | 7/2022 |
| DE | 10335355 A1 | 11/2004 |
| DE | 102009033251 A1 | 9/2010 |
| DE | 102010006440 A1 | 8/2011 |
| DE | 102011109137 A1 | 2/2013 |
| DE | 102018132896 A1 | 6/2020 |
| EP | 0256233 A2 | 2/1988 |
| EP | 2292557 A1 | 3/2011 |
| EP | 3143838 A1 | 3/2017 |
| EP | 3474978 A1 | 5/2019 |
| FR | 2591412 A1 | 6/1987 |
| GB | 2595745 A | 12/2021 |
| IN | 202011017775 | 10/2021 |
| JP | 10-172564 A | 6/1998 |
| JP | 11-064556 A | 3/1999 |
| JP | 2001-348296 A | 12/2001 |
| JP | 2004-505761 A | 2/2004 |
| JP | 2004-193115 A | 7/2004 |
| JP | 2004-311297 A | 11/2004 |
| JP | 2004-362895 A | 12/2004 |
| JP | 2005-015282 A | 1/2005 |
| JP | 2005-072015 A | 3/2005 |
| JP | 2005-135755 A | 5/2005 |
| JP | 2005-187295 A | 7/2005 |
| JP | 2005-222956 A | 8/2005 |
| JP | 2005-272284 A | 10/2005 |
| JP | 2006-040722 A | 2/2006 |
| JP | 2007-138287 A | 6/2007 |
| JP | 2007-149513 A | 6/2007 |
| JP | 2007-238402 A | 9/2007 |
| JP | 2008-230905 A | 10/2008 |
| JP | 2008-243447 A | 10/2008 |
| JP | 2009-187754 A | 8/2009 |
| JP | 2010-024506 A | 2/2010 |
| JP | 2010-097914 A | 4/2010 |
| JP | 2011-108406 A | 6/2011 |
| JP | 2011-222323 A | 11/2011 |
| JP | 2011-258348 A | 12/2011 |
| JP | 2012-046393 A | 3/2012 |
| JP | 2012-151052 A | 8/2012 |
| JP | 2013-062242 A | 4/2013 |
| JP | 2013-063539 A | 4/2013 |
| JP | 2013-076130 A | 4/2013 |
| JP | 2015-048269 A | 3/2015 |
| JP | 2015-122218 A | 7/2015 |
| JP | 2016-047961 A | 4/2016 |
| JP | 2017-524628 A | 8/2017 |
| JP | 2018-141762 A | 9/2018 |
| JP | 2018-190563 A | 11/2018 |
| JP | 2020-121898 A | 8/2020 |
| JP | 2021-061089 A | 4/2021 |
| JP | 2021-061090 A | 4/2021 |
| JP | 2021-116191 A | 8/2021 |
| KR | 10-2007-0076686 A | 7/2007 |
| KR | 10-2009-0070140 A | 7/2009 |
| KR | 10-1133094 B1 | 4/2012 |
| KR | 10-2017-0039922 A | 4/2017 |
| KR | 10-2018-0001799 A | 1/2018 |
| KR | 10-1907912 B1 | 10/2018 |
| KR | 10-1907916 B1 | 10/2018 |
| KR | 10-1923466 B1 | 11/2018 |
| KR | 10-2101006 B1 | 4/2020 |
| KR | 10-2124946 B1 | 6/2020 |
| KR | 10-2020-0131751 A | 11/2020 |
| KR | 10-2021-0057253 A | 5/2021 |
| RU | 2744449 C1 | 3/2021 |
| TW | 521539 B | 2/2003 |
| TW | 200823313 A | 6/2008 |
| TW | I329143 B | 8/2010 |
| TW | 201411922 A | 3/2014 |
| WO | 03/77333 A1 | 9/2003 |
| WO | 2004/054017 A1 | 6/2004 |
| WO | 2004/089821 A1 | 10/2004 |
| WO | 2005/039752 A1 | 5/2005 |
| WO | 2006/100837 A1 | 9/2006 |
| WO | 2011/082596 A1 | 7/2011 |
| WO | 2011/090779 A2 | 7/2011 |
| WO | 2012/114108 A1 | 8/2012 |
| WO | 2012/144424 A1 | 10/2012 |
| WO | 2012/162743 A1 | 12/2012 |

(56) References Cited

FOREIGN PATENT DOCUMENTS

| | | |
|---|---|---|
| WO | 2013/017217 A1 | 2/2013 |
| WO | 2014/011239 A2 | 1/2014 |
| WO | 2014/110604 A2 | 7/2014 |
| WO | 2014/153318 A1 | 9/2014 |
| WO | 2015/064633 A1 | 5/2015 |
| WO | 2015/174949 A1 | 11/2015 |
| WO | 2016/048862 A1 | 3/2016 |
| WO | 2016/091957 A1 | 6/2016 |
| WO | 2017/074081 A1 | 5/2017 |
| WO | 2017/074084 A1 | 5/2017 |
| WO | 2017/080978 A1 | 5/2017 |
| WO | 2017/091543 A1 | 6/2017 |
| WO | 2017/106601 A8 | 7/2017 |
| WO | 2017/118955 A1 | 7/2017 |
| WO | 2017/177315 A1 | 10/2017 |
| WO | 2017/223482 A1 | 12/2017 |
| WO | 2018/133429 A1 | 7/2018 |
| WO | 2018/141082 A1 | 8/2018 |
| WO | 2019/045923 A1 | 3/2019 |
| WO | 2019/052670 A1 | 3/2019 |
| WO | 2019/095039 A1 | 5/2019 |
| WO | 2019/139773 A1 | 7/2019 |
| WO | 2019/243870 A1 | 12/2019 |
| WO | 2019/246242 A1 | 12/2019 |
| WO | 2019/246257 A1 | 12/2019 |
| WO | 2020/009955 A1 | 1/2020 |
| WO | 2020/041767 A1 | 2/2020 |
| WO | 2020/041775 A1 | 2/2020 |
| WO | 2020/091854 A1 | 5/2020 |
| WO | 2020/132343 A1 | 6/2020 |
| WO | 2020/223358 A1 | 11/2020 |
| WO | 2020/223374 A1 | 11/2020 |
| WO | 2021/029769 A1 | 2/2021 |
| WO | 2021/046249 A1 | 3/2021 |
| WO | 2021/085670 A1 | 5/2021 |
| WO | 2021/115596 A1 | 6/2021 |
| WO | 2021/118762 A1 | 6/2021 |
| WO | 2021/127132 A1 | 6/2021 |
| WO | 2021/191281 A1 | 9/2021 |
| WO | 2021/245410 A1 | 12/2021 |
| WO | 2021/245411 A1 | 12/2021 |
| WO | 2021/263273 A1 | 12/2021 |
| WO | 2022/005999 A1 | 1/2022 |
| WO | 2022/032301 A1 | 2/2022 |
| WO | 2022/043701 A1 | 3/2022 |
| WO | 2022/043702 A1 | 3/2022 |
| WO | 2022/043704 A1 | 3/2022 |
| WO | 2022/043705 A1 | 3/2022 |
| WO | 2022/067303 A1 | 3/2022 |
| WO | 2022/075846 A1 | 4/2022 |
| WO | 2022/107907 A1 | 5/2022 |
| WO | 2022/133585 A1 | 6/2022 |
| WO | 2022/136699 A1 | 6/2022 |

OTHER PUBLICATIONS

Ajayi, B. P. et al., "Atmospheric plasma spray pyrolysis of lithiated nickel-manganese-cobalt oxides for cathodes in lithium ion batteries", Chemical Engineering Science, vol. 174, Sep. 14, 2017, pp. 302-310.

Barbis et al., "Titanium powders from the hydride-dehydride process." Titanium Powder Metallurgy. Butterworth-Heinemann, 2015. pp. 101-116.

Houmes et al., "Microwave Synthesis of Ternary Nitride Materials", Journal of Solid State Chemistry, vol. 130, Issue 2, May 1997, pp. 266-271.

Walter et al., "Microstructural and mechanical characterization of sol gel-derived Si—O—C glasses" Journal of the European Ceramic Society, vol. 22, Issue 13, Dec. 2002, pp. 2389-2400.

Wang, J. et al., "Preparation of Spherical Tungsten and Titanium Powders by RF Induction Plasma Processing", Rare Metals, Jun. 2015 (published online May 31, 2014), vol. 34, No. 6, pp. 431-435.

Wang, Y. et al., "Developments in Nanostructured Cathode Materials for High-Performance Lithium-Ion Batteries", Advanced Materials, Jun. 2008, pp. 2251-2269.

Yang et al., "Preparation of Spherical Titanium Powders from Polygonal Titanium Hydride Powders by Radio Frequency Plasma Treatment" Materials Transactions, vol. 54, No. 12 (2013) pp. 2313 to 2316.

Zhang, K., Ph D., "The Microstructure and Properties of Hipped Powder Ti Alloys", a thesis submitted to The University of Birmingham, College of Engineering and Physical Sciences, Apr. 2009, in 65 pages.

Zhang, X. et al., "High thickness tungsten coating with low oxygen content prepared by air plasma spray", Cailliao Gongcheng, 2014, vol. 5, pp. 23-28.

Zhang, Y. D. et al., "High-energy cathode materials for Li-ion batteries: A review of recent developments", Science China Technological Sciences, Sep. 2015, vol. 58(11), pp. 1809-1828.

Zhang, Y. et al., "Microstructures and properties of high-entropy alloys", Progress in Materials Science, Apr. 2014 (available online Nov. 2013), vol. 61, pp. 1-93.

Zhang, Y. S. et al., "Core-shell structured titanium-nitrogen alloys with high strength, high thermal stability and good plasticity", Scientific Reports, Jan. 2017, vol. 7, in 8 pages.

Zielinski, A et al., "Modeling and Analysis of a Dual-Channel Plasma Torch in Pulsed Mode Operation For Industrial Space, and Launch Applications", IEEE Transactions on Plasma Science, Jul. 2015, vol. 43(7), pp. 2201-2206.

"Build Boldly", Technology Demonstration, 6K Additive, [publication date unknown], in 11 pages.

Ajayi, B. et al., "A rapid and scalable method for making mixed metal oxide alloys for enabling accelerated materials discovery", Journal of Materials Research, Jun. 2016, vol. 31, No. 11, pp. 1596-1607.

Bobzin, K. et al., "Modelling and Diagnostics of Multipie Cathodes Plasma Torch System for Plasma Spraying", Frontiers of Mechanical Engineering, Sep. 2011, vol. 6, pp. 324-331.

Bobzin, K. et al., "Numerical and Experimental Determination of Plasma Temperature during Air Plasma Spraying with a Multiple Cathodes Torch", Journal of Materials Processing Technology, Oct. 2011, vol. 211, pp. 1620-1628.

Boulos, M. I., "The inductively coupled radio frequency plasma." Journal of High Temperature Material Process, Jan. 1997, vol. 1, pp. 17-39.

Boulos, M., "Induction Plasma Processing of Materials for Powders, Coating, and Near-Net-Shape Parts", Advanced Materials & Processes, Aug. 2011, pp. 52-53, in 3 pages.

Boulos, M., "Plasma power can make better powders", Metal Powder Report, May 2004, vol. 59(5), pp. 16-21.

Carreon, H. et al., "Study of Aging Effects in a Ti—6AL—4V alloy with Widmanstatten and Equiaxed Microstructures by Nondestructive Means", AIP Conference Proceedings 1581, 2014 (published online Feb. 17, 2015), pp. 739-745.

Chang, S. et al., "One-Step Fast Synthesis of Li4Ti5O12 Particles Using an Atmospheric Pressure Plasma Jet", Journal of the American Ceramic Society, Dec. 26, 2013, vol. 97, No. 3, pp. 708-712.

Chen, G. et al., "Spherical Ti—6Al—4V Powders Produced by Gas Atomization", Key Engineering Materials, vol. 704, Aug. 2016, pp. 287-292. URL: https://www.scientific.net/KEM.704.287.

Chikumba et al., "High Entropy Alloys: Development and Applications" 7th International Conference on Latest Trends in Engineering & Technology (ICLTET'2015) Nov. 26-27, 2015 Irene, Pretoria (South Africa).

Coldwell, D. M. et al., "The reduction of $SiO_2$ with Carbon in a Plasma", Journal of Electrochemical Society, Jan. 1977, vol. 124, pp. 1686-1689.

Dearmitt, C., "26. Functional Fillers for Plastics", in Applied Plastics Engineering Handbook—Processing and Materials, ed., Myer Kutz, Elsevier, 2011, pp. 455-468.

Dolbec, R., "Recycling Spherical Powders", Presented at Titanium 2015, Orlando, FL, Oct. 2015, in 20 pages.

Fuchs, G.E. et al., "Microstructural evaluation of as-solidified and heat-treated y—TiAl based powders", Materials Science and Engineering, 1992, A152, pp. 277-282.

(56) References Cited

OTHER PUBLICATIONS

Gleiman, S. et al., "Melting and spheroidization of hexagonal boron nitride in a microwave-powered, atmospheric pressure nitrogen plasma", Journal of Materials Science, Aug. 2002, vol. 37(16), pp. 3429-3440.
Gradl, P. et al., "GRCop-42 Development and Hot-fire Testing Using Additive Manufacturing Powder Bed Fusion for Channel-Cooled Combustion Chambers", 55th AIAA/SAE/ASEE Joint Propulsion Conference 2019, Aug. 2019, pp. 1-26.
He et al., "A precipitation-hardened high-entropy alloy with outstanding tensile properties" Acta Materialia 102, Jan. 2016, pp. 187-196.
International Preliminary Report on Patentability and Written Opinion, re PCT Application No. PCT/US2020/030487, dated Nov. 11, 2021.
International Search Report and Written Opinion, re PCT Application No. PCT/US2020/030487, dated Jul. 27, 2020.
Ivasishin, et al., "Innovative Process for Manufacturing Hydrogenated Titanium Powder for Solid State Production of R/M Titanium Alloy Components" Titanium 2010, Oct. 3-6, 2010, 27 pages.
Jia, H. et al., "Hierarchical porous silicon structures with extraordinary mechanical strength as high-performance lithium-ion battery anodes", Nature Communications, Mar. 2020, vol. 11, in 9 pages. URL: httos://doi.ora/10.1038/s41467-020-15217-9.
Ko, M. et al., "Challenges in Accommodating Volume Change of Si Anodes for Li-Ion Batteries", Chem Electro Chem, Aug. 2015, vol. 2, pp. 1645-1651. URL: https://doi.org/10.1002/celc.201500254.
Kotlyarov, V. I. et al., "Production of Spherical Powders on the Basis of Group IV Metals for Additive Manufacturing", Inorganic Materials: Applied Research, Pleiades Publishing, May 2017, vol. 8, No. 3, pp. 452-458.
Laine, R. M. et al., "Making nanosized oxide powders from precursors by flame spray pyrolysis", Key Engineering Materials, Jan. 1999, vol. 159-160, pp. 17-24.
Li, L. et al., "Spheroidization of silica powders by radio frequency inductively coupled plasma with Ar—H2 and Ar—N2 as the sheath gases at atmospheric pressure", International Journal of Minerals, Metallurgy, and Materials, Sep. 2017, vol. 24(9), pp. 1067-1074.
Li, X. et al., "Mesoporous silicon sponge as an anti-pulverization structure for high-performance lithium-ion battery anodes", Nature Communications, Jul. 2014, vol. 5, Article No. 4105, in 7 pages. URL: httDs://doi.orq/10.1038/ncomms5105.
Li, Z. et al., "Strong and Ductile Non-Equiatomic High-Entropy Alloys: Design, Processing, Microstructure, and Mechanical Properties", The Journal of the Minerals, Metals & Materials Society, Aug. 2017, vol. 69(1), pp. 2099-2106. URL: https://doi.org/10.1007/s11837-017-254Q-0.
Lin, M., "Gas Quenching with Air Products' Rapid Gas Quenching Gas Mixture", Air Products, Dec. 31, 2007, in 4 pages. URL: https://www.airproducts.co.uk/-/media/airproducts/files/en/330/330-07-085-us-gas-quenching-with-air-products-rapid-gas-quenching-gas-mixture.pdf.
Majewksi, T., "Investigation of W—Re—Ni heavy alloys produced from plasma spheroidized powders", Solid State Phenomena, Mar. 2013, vol. 199, pp. 448-453.
Moisan, M. et al., "Waveguide-Based Single and Multipie Nozzle Plasma Torches: the Tiago Concept", Plasma Sources Science and Technology, Jun. 2001, vol. 10, pp. 387-394.
Moldover, M. R. et al., "Measurement of the Universal Gas Constant R Using a Spherical Acoustic Resonator", Physical Review Letters, Jan. 1988, vol. 60(4), pp. 249-252.
Muoto, C. et al., "Phase Homogeneity in Y2O3—MgO Nanocomposites Synthesized by Thermal Decomposition of Nitrate Precursors with Ammonium Acetate Additions" J. Am. Ceram. Soc., 94[12] 4207-4217, 2011.
Murugan et al. Nanostructured a/ß-tungsten by reduction of WO3 under microwave plasma. Int. Journal of Refractory Metals and Hard Materials 29 (2011) 128-133. (Year: 2011).
Nichols, F. A., "On the spheroidization of rod-shaped particles of finite length", Journal of Materials Science, Jun. 1976, vol. 11, pp. 1077-1082.
Nyutu, E. et al., "Ultrasonic Nozzle Spray in Situ Mixing and Microwave-Assisted Preparation of Nanocrystalline Spinel Metal Oxides: Nickel Ferrite and Zinc Aluminate", Journal of Physical Chemistry C, Feb. 1, 2008, vol. 112, No. 5, pp. 1407-1414.
Ohta, R. et al., "Effect of PS-PVD production throughput on Si nanoparticles for negative electrode of lithium ion batteries", Journal of Physics D: Applied Physics, Feb. 2018, vol. 51(1), in 7 pages.
Or, T. et al., "Recycling of mixed cathode lithium-ion batteries for electric vehicles: Current status and future outlook", Carbon Energy, Jan. 2020, vol. 2, pp. 6-43. URL: https://doi.org/10.1002/cey2.29.
Park et al. Preparation of spherical WTaMoNbV refractory high entropy alloy powder by inductively-coupled thermal plasma. Materials Letters 255 (2019) 126513 (Year: 2019).
Popescu et al. "New TiZrNbTaFe high entropy alloy used for medical applications" IOP Conference Series: Materials Science and Engineering 400. Mod Tech 2018 (2018), 9 pages.
Reig, L. et al., "Microstructure and Mechanical Behavior of Porous Ti—6Al—4V Processed by Spherical Powder Sintering", Materials, Oct. 23, 2013, vol. 6, pp. 4868-4878.
Sastry, S.M.L. et al., "Rapid Solidification Processing of Titanium Alloys", Journal of Metals (JOM), Sep. 1983, vol. 35, pp. 21-28.
Savage, S. J. et al., "Production of rapidly solidified metals and alloys", Journal of Metals (JOM), Apr. 1984, vol. 36, pp. 20-33.
Sheng, Y. et al., "Preparation of Micro-spherical Titanium Powder by RF Plasma", Rare Metal Materials and Engineering, Jun. 2013, vol. 42, No. 6, pp. 1291-1294.
Sheng, Y. et al., "Preparation of Spherical Tungsten Powder by RF Induction Plasma", Rare Metal Materials and Engineering, Nov. 2011, vol. 40, No. 11, pp. 2033-2037.
Suryanarayana, C. et al., "Rapid soiidification processing of titanium alloys", International Materials Reviews, 1991, vol. 36, pp. 85-123.
Suryanarayana, C., "Recent Developments in Mechanical Alloying", Reviews on Advanced Materials Science, Aug. 2008, vol. 18(3), pp. 203-211.
Tang, H. P. et al., "Effect of Powder Reuse Times on Additive Manufacturing of Ti—6Al—4V by Selective Electron Beam Melting", JOM, Mar. 2015, vol. 67, pp. 555-563.
Van Laar, J. H. et al., "Spheroidisation of Iron Powder in a Microwave Plasma Reactor", Journal of the Southern African Institute of Mining and Metallurgy, Oct. 2016, vol. 116, No. 10, pp. 941-946.
Veith et al., "Low temperature synthesis of nanocrystalline Y3Al5012 (YAG) and Cedoped Y3Al5012 via different sol-gel methods." J Mater Chem, (1999) 9: 3069-3079.

\* cited by examiner

MECHANICALLY ALLOYED POWDER FEEDSTOCK

INCORPORATION BY REFERENCE TO ANY PRIORITY APPLICATIONS

This application is a continuation of U.S. patent application Ser. No. 16/861,594 entitled MECHANICALLY ALLOYED POWDER FEEDSTOCK, filed on Apr. 29, 2020, now U.S. Pat. No. 11,311,938, which claims the benefit to U.S. Provisional Patent Application No. 62/840,607 entitled "MECHNICALLY ALLOYED POWDER FEEDSTOCK," filed on Apr. 30, 2019, the contents of which is hereby incorporated by reference in its entireties.

BACKGROUND

Field

The present disclosure is generally directed in some embodiments towards producing metal spherical or spheroidal powder products that include properties achieved by mechanical alloying.

Description of the Related Art

Metal powders are being used industrially for certain applications. Recently there is an increased interest in metal powders for use in additive manufacturing. Metal alloy powders are generally manufactured by various atomizing techniques—water atomizing, gas atomizing, or thermochemical methods. The morphology of powders produced can depend on the method of manufacture of the powders. Further, different morphologies can be suitable for different consolidation methods or uses of powders. For example, additive manufacturing (AM), especially laser-based AM systems such as powder bed fusion, may benefit from spherical powders due to their excellent flowability, spreadability, and packing density.

SUMMARY

Disclosed herein are embodiments of a method for manufacturing a spheroidized powder from a mechanically-alloyed feedstock, the method comprising preparing a mechanically-alloyed powder feedstock by mechanically milling at least five elemental powders to mechanically alloy the at least five elemental powders, introducing the mechanically-alloyed powder feedstock into a microwave plasma torch, a plasma plume of the microwave plasma torch, and/or an exhaust of the microwave plasma torch, and at least partially melting and spheroidizing the mechanically-alloyed powder feedstock within the microwave plasma torch, the plasma plume of the microwave plasma torch, and/or the exhaust of the microwave plasma torch to form spheroidized powder.

Also disclosed herein are embodiments of a method for manufacturing a spheroidized powder from a mechanically alloyed feedstock, the method comprising preparing a mechanically-alloyed powder feedstock by mechanically milling one or more precursors to form a high entropy alloy, introducing the mechanically-alloyed powder feedstock into a microwave plasma torch, a plasma plume of the microwave plasma torch, and/or an exhaust of the microwave plasma torch, and at least partially melting and spheroidizing the mechanically-alloyed powder feedstock within the microwave plasma torch, the plasma plume of the microwave plasma torch, and/or the exhaust of the microwave plasma torch to form spheroidized powder.

Further disclosed herein are embodiments of a method for manufacturing a spheroidized powder from a mechanically-alloyed feedstock, the method comprising introducing a mechanically-alloyed powder feedstock into a microwave plasma torch, a plasma plume of the microwave plasma torch, and/or an exhaust of the microwave plasma torch, wherein the mechanically-alloyed powder feedstock is prepared by mechanically milling at least five elemental powders to mechanically alloy the at least five elemental powders, and melting and spheroidizing the mechanically-alloyed powder feedstock within the microwave plasma torch, the plasma plume of the microwave plasma torch, and/or the exhaust of the microwave plasma torch to form spheroidized powder.

In some embodiments, the spheroidized powder can be melted and spheroidized for use in metal injection molding processes. In some embodiments, the spheroidized powder can be melted and spheroidized for use in hot isostatic processing. In some embodiments, the spheroidized powder can be melted and spheroidized for use in additive manufacturing.

In some embodiments, the mechanically-alloyed powder feedstock can be mechanically milled by ball milling. In some embodiments, the melting the mechanically-alloyed powder feedstock can be performed in less than 1 second. In some embodiments, the melting the mechanically-alloyed powder feedstock can be performed in less than 500 milliseconds.

In some embodiments, the mechanically-alloyed powder feedstock can comprise TiZrNbTaFe. In some embodiments, the mechanically-alloyed powder feedstock can comprise AlFeVSi. In some embodiments, the mechanically-alloyed powder feedstock can comprise FeCoNiCrTi. In some embodiments, the mechanically-alloyed powder feedstock can comprise FeCoNiCrAl. In some embodiments, the mechanically-alloyed powder feedstock can comprise FeCoNiCrCu. In some embodiments, the mechanically-alloyed powder feedstock can have a microstructure, and wherein the spheroidized powder maintains the microstructure.

A spheroidized powder formed from the method of embodiments of the disclosure.

DETAILED DESCRIPTION

Figure 1:
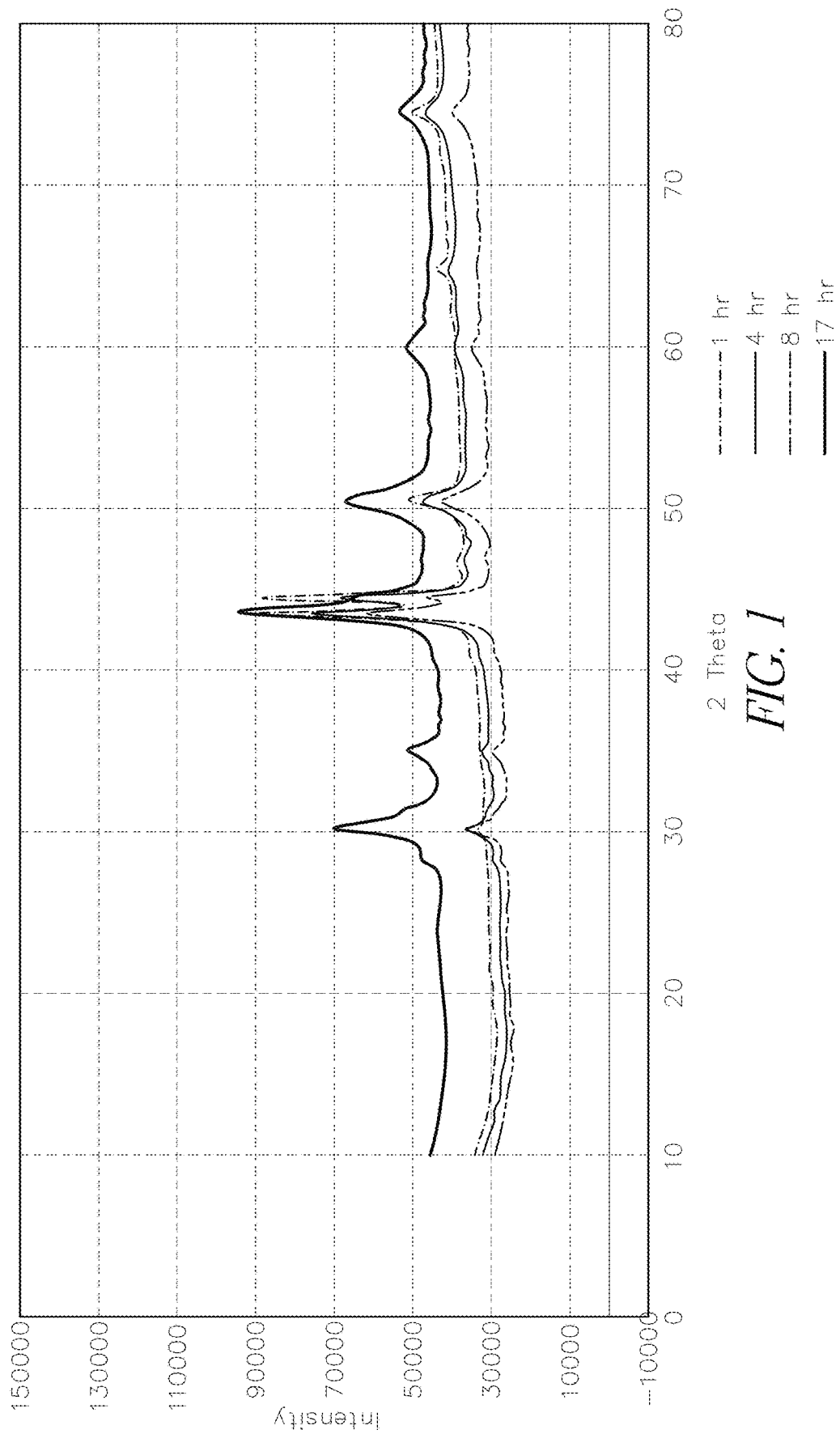
FIG. 1 illustrates a transition of an arbitrary feedstock powder with time.

Disclosed herein are embodiments of methods, devices, and assemblies for utilizing mechanically alloyed materials (such as powders) as feedstock, in particular for microwave plasma processing and powders and products produced from the same. It has been extremely difficult to prepare such powders from the mechanically alloyed feedstock, an unexpected properties have been achieved based on embodiments of this disclosure.

In some embodiments, materials can be milled together to form a desired composition of particles of a powder, thereby creating mechanically milled alloys. Other methods of alloying can be used as well, and the disclosure is not limited to mechanical milling.

In some embodiments the mechanically milled alloys can be high entropy alloys (HEAs) or can be complex concentrated alloys (CCAs), or can be modified alloys from existing alloys. HEAs are alloys that primarily contain 5 or more elements in equi-atomic or non equi-atomic percent. The powder, or other components, can then be used as a feedstock (such as a powder feedstock) for a microwave plasma process to form a final spheroidized powder, which can then be used in different processes, such as additive manufacturing processes.

There is a need to develop novel alloys, such as high entropy alloys (HEA) that yield superior properties when processed with additive manufacturing methods.

Further, with the advent of additive manufacturing (AM), there is ever increasing need to develop novel alloys that could be processed with AM and could push the envelope of the properties obtained by conventional or existing alloys.

In some embodiments, HEAs may be alloys that are formed by mixing equal or relatively large proportions of a relatively large number of elements. In some embodiments, the number of elements within a HEA may be 3 or more, 4 or more, 5 or more, or 6 or more, 7 or more, 8 or more. In some embodiments, the relative proportions by atomic percentage may be equal or close to equal. In some embodiments HEAs may be alloys with high entropy of mixing, e.g., greater than 1.67R (or greater than about 1.67R), such as described in *JOM*, by Z. Li and D, Raabe, 2017, DOES: 10.1007/s11837-017-2540-2, hereby incorporated by reference.

HEAs may have advantageous properties, or combinations of properties, such as high elevated temperature strength, high temperature oxidation resistance, high corrosion resistance and high strength to weight ratio as compared with conventional alloys in use. Due to limited solubility of elements in each other, most compositions of HEAs, especially non-equi atomic HEAs, are difficult or impossible to manufacture by traditional methods such as arc melting and induction melting. Further, the vast differences in the melting points of the alloying elements in HEAs limit their processing by conventional methods.

Such elements could be alloyed in solid state by mechanical alloying techniques, such as where the elemental powders, pre-alloyed powders, or master alloy powders are ball milled until a homogeneous alloy is formed. In ball milling, the alloys are mechanically forced to combine into an alloy. This alloying can then be homogenized with milling time. The homogenization of the alloy is often monitored by x-ray diffraction (XRD), where the initial individual elemental peaks of the alloying elements gradually disappear, and new peaks of alloyed phase or phases appear.

With proper ball mill parameters, such as, for example, ball-to-metal ratio, rotation speed, and/or ball size, different processes can occur during the alloying. For example, the resulting powder may have undergone agglomeration, mechanical alloying, mixing, blending, or milling. Some or all of which may occur during the process.

Figure 6:
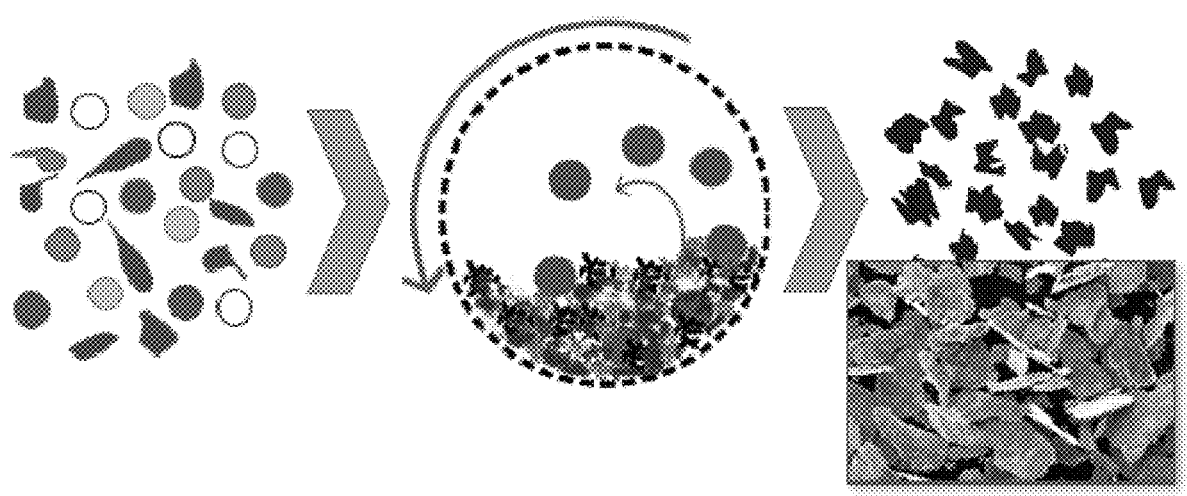
FIG. 6 illustrates an embodiment of a mechanical alloying process.

The resulting powder, however, is of irregular and flake like morphology limiting further processing/consolidation techniques such as spark plasma sintering. Embodiments of this disclosure describe manufacturing of spherical HEA powders processed by mechanical alloying and treated with microwave plasma spheroidization. Spherical powders then could be used for a range of industrial powder consolidation processes such as Additive Manufacturing, Metal Injection Molding, Hot Isostatic Processing and Powder Forging Mechanical alloying is a solid-state powder metallurgy process where elemental or pre-alloyed powder particles are milled with a high energy ball mill. Powder particles during this process are subjected to repeated cold welding, fracturing and re-welding. Transfer of mechanical energy to the powder particles introduces strain into powder by generating dislocations, which act as fast diffusion paths. FIG. 6 illustrates an example of such a method. As shown, the elemental powders (left) can be mechanically milled (middle) to produce a feedstock (right).

Further, diffusion distances are reduced due to grain refinement. Thus, an alloy can be manufactured by this process with different phases and different microstructure than that of the base powders. The actual milling time can vary depending on the feed material and alloy. For example, greater than 1, 2, 3, 4, 5, 6, 7, 8, 9, or 10 hours (or about 1, about 2, about 3, about 4, about 5, about 6, about 7, about 8, about 9, or about 10 hours). In some embodiments, the milling can last less than 1, 2, 3, 4, 5, 6, 7, 8, 9, or 10 hours (or about 1, about 2, about 3, about 4, about 5, about 6, about 7, about 8, about 9, or about 10 hours). In some embodiments, the milling can continue until a partial or complete homogenization is attained, such as by monitoring XRD patterns and following the disappearance of the individual elemental peaks.

Advantageously, mechanical alloying may increase the homogenization of the particles because the elements are mechanically forced into each other reducing the diffusion paths between the alloying elements. This homogenization also can be enhanced with increased milling time.

Microwave assisted plasma technology can provide for a continuous and sustainable plasma plume with the temperatures reaching on the order of 6000K. By adjusting the plasma plume characteristics, such as plume length and plume density, it is possible to spheroidize and homogenize mechanically alloyed highly irregular or flaky HEA or mechanically-alloyed powders. Further, by adjusting where the feedstock enters the plasma plume, plasma afterglow, or plasma exhaust of the microwave plasma torch may be used to adjust the temperature the feedstock is subjected to.

Irregular or flaky powders may limit the processing method to spark plasma sintering and thus it can be advantageous to spheroidize them for more expanded use across the powder consolidation methods. For example, HIP may benefit from a tap density of the powders to be more than ~60% of the theoretical density of the alloy in order to achieve full density after HIP. Other powder processing methods may benefit from high flowability and/or spreadability of the powder, such as during additive manufacturing. Irregular and flaky powders have poor flow properties making then difficult or impossible to process. Thus, microwave plasma processing may transform irregular and flaky powders into spheroidal powder which may be used for various manufacturing processes.

Due to less residence time in a microwave plasma process, estimated to be up to few hundred milliseconds, at high temperatures, the powders are partially melted, which will increase the homogenization of the mechanically alloyed powders.

Accelerated processing through microwave plasma processing of mechanically alloyed particles with heat increases diffusion of the alloying elements into the bulk of the particle, hence increasing homogeneity. After plasma processing, the spherical HEA powders then can be processed with various industrial powder consolidation methods such as, but not limited to, additive manufacturing (AM), metal injection molding (MIM), powder forging and hot isostatic pressing (HIP) bringing HEA to mainstream industrial processing.

After feedstock is created from mechanical alloying, the feedstock includes a certain material composition. The set of process parameters for microwave plasma processing may be selected based on the material composition. The process parameters may be tailored to allow for varying homogeneous alloying and/or spheroidization.

This set of process parameters may include microwave power, plasma gas flows, gas types, plasma plume length, plasma plume diameter, plasma jet velocity, exhaust chamber pressure, quench gases, exhaust gas velocity, feedstock velocity vis-à-vis plasma jet velocity, feed gas flow, and feedstock feed-rates, or a combination thereof. This set of process parameters may further include the portion of the plasma, plasma plume, and/or plasma exhaust the feedstock enters into. For example, the feedstock may be fed in an area of the plasma exhaust that is cooler if a cooler temperature is desired.

As disclosed herein, melting can include fully melting, partially melting, or melting a surface of a particular feedstock.

Feedstock

The feedstock for the microwave plasma processing can be developed by mechanical alloying. Advantageously, mechanical alloying may develop alloys which are otherwise difficult or impossible to manufacture by other alloying methods such as arc melting and induction melting. The unique alloys that can be formed with mechanical alloying include HEAs which, on laboratory scale have demonstrated unique properties over conventional alloys.

In mechanical alloying, the feedstock can be milled mechanically to achieve homogenization, which can be measured/monitored using XRD techniques. As the time for mechanical alloying increases, different peaks appear on the XRD spectra indicating the formation of alloyed phases. The milling is continued until a stable XRD spectra is obtained, the stable XRD spectra being a spectra which does not change with increased milling time, thereby indicating a chemically stable alloy.

The resultant powder is highly irregular and flaky due to intensive mechanical milling. For example, an irregular powder can be particles having an irregular or angular morphology, such as in water atomized powders. On the other hand, flaky powder may have relatively large aspect ratios and are thin, having very low apparent density and packing density, which makes them difficult to flow, spread, and process. Both irregular and flaky powders are unsuitable for industrial powder consolidation methods.

However, the resultant powder from mechanical milling has been demonstrated to be an ideal feedstock for microwave plasma processing. Microwave plasma processing can spheroidize the machined powder which is in irregular or flaky form. FIG. 1 depicts the transition of an example feedstock powder with time during the milling process. Illustrated are XRD scans performed on powder that has been mechanically milled for 1 hour, 4 hours, 8 hours, and 17 hours. As illustrated, as time increases, several peaks in the XRD scans attenuate or substantially disappear. Further, new peaks are enhanced or appear indicating the formation or increase of alloyed phases.

HEAs due to their extraordinary properties are of interest to several applications. For example, for medical implants TiZrNbTaFe HEAs have shown much improved corrosion resistance compared to Ti-6Al-4V alloys currently being used. AlFeVSi alloys may have high strength and high thermal stability making them of interest to aerospace industry by potential structural weight reduction. Similarly FeCoNiCrTi or FeCoNiCrAl HEAs have been shown to achieve extraordinary tensile properties at room temperature making them attractive for many industrial applications. In some embodiments, FeCoCrNiCu HEAs can be used.

The mechanically alloyed powder when spheroidized with microwave plasma processing yields highly spherical powder. This spherical powder then can be used as feedstock material for various industrial consolidation methods like additive manufacturing, metal injection molding, powder forging and hot isostatic pressing. Advantageously, the microstructure (or nanostructure) of the mechanically milled powders can be maintained throughout the processing, such as after the plasma processing.

Figure 2:
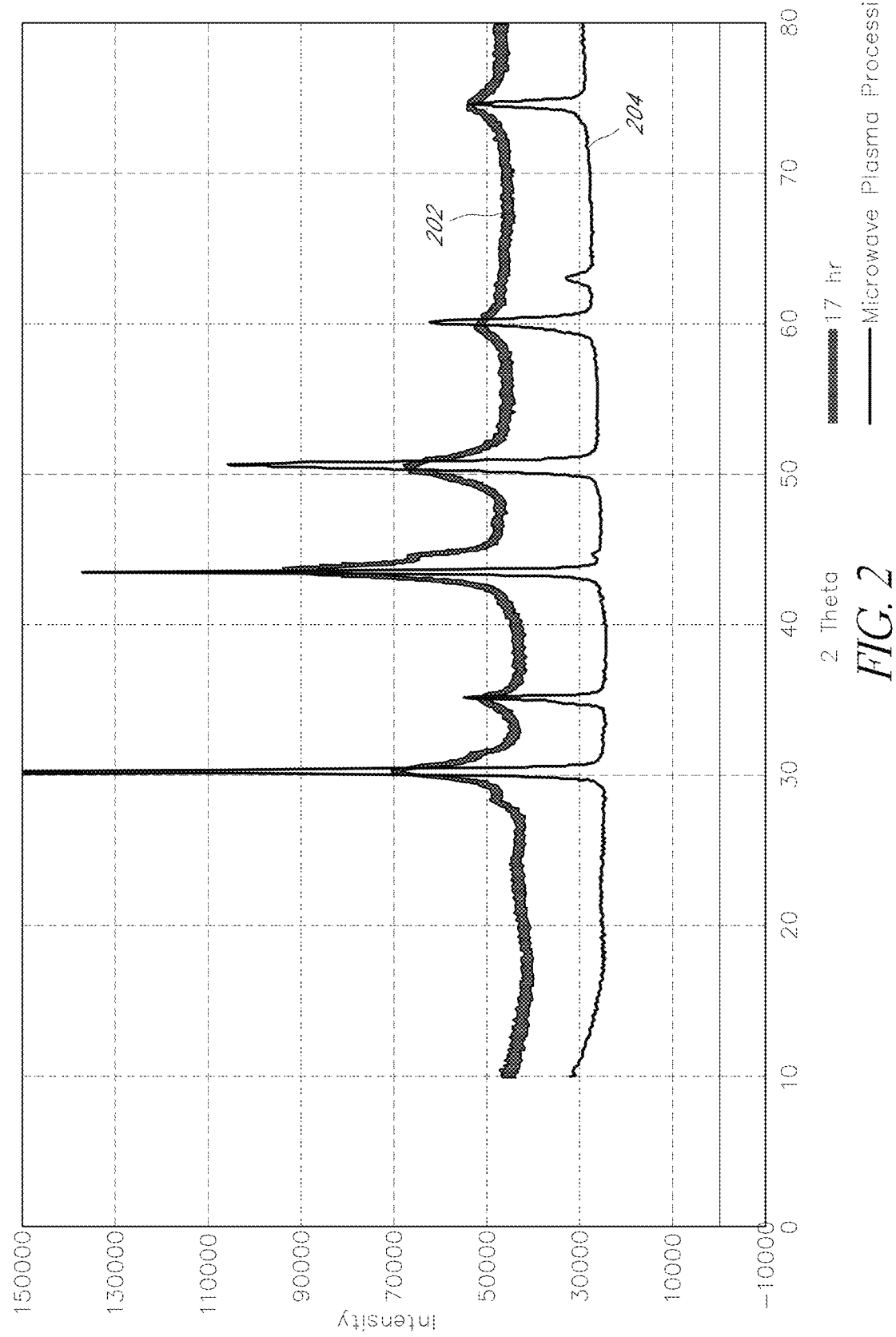
FIG. 2 illustrates an XRD spectra of powders pre and post microwave plasma processing.

FIG. 2 shows the XRD spectra of an example powder (having an example composition including 25Fe-17Co-17Cr-17Ni-16Cu before and after microwave plasma processing spheroidization. Other example compositions include Fe-25, Ni-19, Cr-13, Co-0.45, Ti-2.5, Mo-2.4, Nb-0.4, Cu-0.2, Re. The line 202 illustrates an XRD plot of a powder feedstock after 17 hours of mechanical alloying but before microwave plasma processing. The line 204 illustrates an XRD plot of the powder feedstock after microwave plasma processing.

As shown, the alloy is more homogenized after the spheroidization process. Homogenizing refers to forming an alloy from the starting individual elemental powders. This can be seen from the XRD spectrum where individual peaks representing elements disappear and alloy peaks appear. After spheroidization the alloy peaks are more defined, eliminating remaining background peaks indicating enhanced homogenization of mechanically alloyed powder. Thus, the microwave plasma processing not only spheroidizes the powder feedstock but further homogenizes the feedstock.

With proper optimization, the milling time for mechanical alloying can be reduced because homogenizing can be accomplished using microwave plasma processing spheroidization. Without being limited to a single theory, since milling produces refined grains, mechanical alloying greatly reduces diffusion distances within the powder. Thus, after mechanical alloying, during microwave plasma processing, diffusion can occur rapidly at high temperatures thereby enhancing the homogenization of the alloy produced by mechanical alloying. Thus, microwave plasma processing can create similar homogenization as long periods of milling time for mechanical alloying. A milling time may be shortened when the feedstock is microwave plasma processed.

Mechanical alloying could also be used for alloys other than HEAs. Any existing alloy could be manufactured by mechanical alloying for example, stainless steels such as stainless steel type 316 and 17-4, or Ni base Inconels such as 718, 625, 738 etc. Embodiments of the disclosure can be effectively and economically used to develop new alloys or modify existing alloys to be used in emerging consolidation techniques such as Additive Manufacturing Mechanical alloying is a solid state process. So technically any alloy could be manufactured by mechanical alloying. However, for conventional alloys or the alloys that can be manufactured in liquid state such as melting, these processes are much faster and economical than mechanical alloying. Hence they are rarely used for such alloys. Nevertheless, mechanical alloying may be used to also produce alloys that can be manufactured in liquid state such as melting.

Spheroidization

In some embodiments, the final particles achieved by the plasma processing can be spherical or spheroidal, terms which can be used interchangeably. Advantageously, by using the critical and specific disclosure relevant to each of the different feedstocks disclosed, all of the feedstocks can be transformed into the spherical powders.

Embodiments of the present disclosure are directed to producing particles that are substantially spherical or spheroidal or have undergone significant spheroidization. In some embodiments, spherical, spheroidal or spheroidized particles refer to particles having a sphericity greater than a certain threshold. Particle sphericity can be calculated by calculating the surface area of a sphere $A_{s,ideal}$ with a volume matching that of the particle, V using the following equation:

$$r_{ideal} = \sqrt[3]{\frac{3V}{4\pi}}$$

$$A_{s,ideal} = 4\pi r_{ideal}^2$$

and then comparing that idealized surface area with the measured surface area of the particle, $A_{s,actual}$:

$$Sphericity = \frac{A_{s,ideal}}{A_{s,actual}}.$$

In some embodiments, particles can have a sphericity of greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, particles can have a sphericity of 0.75 or greater or 0.91 or greater (or about 0.75 or greater or about 0.91 or greater). In some embodiments, particles can have a sphericity of less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a particle is considered to be spherical, spheroidal or spheroidized if it has a sphericity at or above any of the aforementioned sphericity values, and in some preferred embodiments, a particle is considered to be spherical if its sphericity is at or about 0.75 or greater or at or about 0.91 or greater.

In some embodiments, a median sphericity of all particles within a given powder can be greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, a median sphericity of all particles within a given powder can be less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a powder is considered to be spheroidized if all or a threshold percentage (as described by any of the fractions below) of the particles measured for the given powder have a median sphericity greater than or equal to any of the aforementioned sphericity values, and in some preferred embodiments, a powder is considered to be spheroidized if all or a threshold percentage of the particles have a median sphericity at or about 0.75 or greater or at or about 0.91 or greater.

In some embodiments, the fraction of particles within a powder that can be above a given sphericity threshold, such as described above, can be greater than 50%, 60%, 70%, 80%, 90%, 95%, or 99% (or greater than about 50%, about 60%, about 70%, about 80%, about 90%, about 95%, or about 99%). In some embodiments, the fraction of particles within a powder that can be above a given sphericity threshold, such as described above, can be less than 50%, 60%, 70%, 80%, 90%, 95%, or 99% (or less than about 50%, about 60%, about 70%, about 80%, about 90%, about 95%, or about 99%).

Particle size distribution and sphericity may be determined by any suitable known technique such as by SEM, optical microscopy, dynamic light scattering, laser diffraction, manual measurement of dimensions using an image analysis software, for example from about 15-30 measures per image over at least three images of the same material section or sample, and any other techniques.

Microwave Plasma Processing

The process parameters can be optimized to obtain maximum spheroidization depending on the powder initial condition. For each feedstock powder characteristic, process parameters can be optimized for a particular outcome. U.S. Pat. Pub. No. 2018/0297122, U.S. Pat. Nos. 8,748,785, and 9,932,673 disclose certain processing techniques that can be used in the disclosed process, specifically for microwave plasma processing. Accordingly, U.S. Pat. Pub. No. 2018/0297122, U.S. Pat. Nos. 8,748,785, and 9,932,673 are incorporated by reference in its entirety and the techniques describes should be considered to be applicable to the feedstock described herein.

One aspect of the present disclosure involves a process of spheroidization of metals and metal alloys using a microwave generated plasma. The powder feedstock is entrained in inert and/or reducing and/or oxidizing gas environment and injected into the microwave plasma environment. Upon injection into a hot plasma, the feedstock is spheroidized and released into a chamber filled with an inert gas and directed into hermetically sealed drums where is it stored. This process can be carried out at atmospheric pressure, in a partial vacuum, or at a slightly higher pressure than atmospheric pressure. In alternative embodiments, the process can be carried out in a low, medium, or high vacuum environment. The process can run continuously and the drums are replaced as they fill up with spheroidized metal or metal alloy particles.

The rate of cooling of the spheroidized metal and metal alloys can be controlled to strategically influence the microstructure of the powder. By controlling the process parameters such as cooling gas flow rate, residence time, cooling gas composition etc., microstructure of the metal and metal alloys can be controlled. The precise cooling rates required to form these structures is largely a function of the type and quantity of the alloying elements within the material.

The rate of cooling, especially when combined with the consistent and uniform heating capabilities of a microwave plasma plume, allow for control over the final microstructure. As a result, the above methods can be applied to processing metal (e.g., mechanical alloying and/or HEA) feedstock.

Cooling processing parameters include, but are not limited to, cooling gas flow rate, residence time of the spheroidized particles in the hot zone, and the composition or make of the cooling gas. For example, the cooling rate or quenching rate of the particles can be increased by increasing the rate of flow of the cooling gas. The faster the cooling gas is flowed past the spheroidized particles exiting the plasma, the higher the quenching rate-thereby allowing certain desired microstructures to be locked-in. Residence time of the particles within the hot zone of the plasma can also be adjusted to provide control over the resulting microstructure. That is, the length of time the particles are exposed to the plasma determines the extent of melting of the particle (i.e., surface of the particle melted as compared to the inner most portion or core of the particle).

Consequently, the extent of melting effects the extent of cooling needed for solidification and thus it is a cooling process parameter. Microstructural changes can be incorporated throughout the entire particle or just a portion thereof depending upon the extent of particle melting. Residence time can be adjusted by adjusting such operating variables of particle injection rate and flow rate (and conditions, such as laminar flow or turbulent flow) within the hot zone. Equipment changes can also be used to adjust residence time. For example, residence time can be adjusted by changing the cross-sectional area of the hot zone.

Another cooling processing parameter that can be varied or controlled is the composition of the cooling gas. Certain cooling gases are more thermally conductive than others. For example helium is considered to be a highly thermally conductive gas. The higher the thermal conductivity of the cooling gas, the faster the spheroidized particles can be cooled/quenched. By controlling the composition of the cooling gas (e.g., controlling the quantity or ratio of high thermally conductive gasses to lesser thermally conductive gases) the cooling rate can be controlled.

As is known in metallurgy, the microstructure of a metal is determined by the composition of the metal and heating and cooling/quenching of the material. In the present technology, by selecting (or knowing) the composition of the feedstock material, and then exposing the feedstock to a plasma that has the uniform temperature profile and control there over as provided by the microwave plasma torch, followed by selecting and controlling the cooling parameters control over the microstructure of the spheroidized metallic particle is achieved. In addition, the phase of the metallic material depends upon the compositions of the feed stock material (e.g., purity, composition of alloying elements, etc.) as well thermal processing.

In one exemplary embodiment, inert gas is continually purged surrounding a powdered metal feed to remove oxygen within a powder-feed hopper. A continuous volume of powder feed is then entrained within an inert gas and fed into the microwave generated plasma for dehydrogenation or for composition/maintaining purity of the spheroidized particles. In one example, the microwave generated plasma may be generated using a microwave plasma torch, as described in U.S. Patent Publication No. US 2013/0270261, and/or U.S. Pat. Nos. 8,748,785, 9,023,259, 9,206,085, 9,242,224, and 10,477,665, each of which is hereby incorporated by reference in its entirety.

In some embodiments, the particles are exposed to a uniform temperature profile at between 4,000 and 8,000 K within the microwave generated plasma. In some embodiments, the particles are exposed to a uniform temperature profile at between 3,000 and 8,000 K within the microwave generated plasma. Within the plasma torch, the powder particles are rapidly heated and melted. Liquid convection accelerates $H_2$ diffusion throughout the melted particle, continuously bringing hydrogen ($H_2$) to the surface of the liquid metal hydride where it leaves the particle, reducing the time each particle is required to be within the process environment relative to solid-state processes. As the particles within the process are entrained within an inert gas, such as argon, generally contact between particles is minimal, greatly reducing the occurrence of particle agglomeration. The need for post-process sifting is thus greatly reduced or eliminated, and the resulting particle size distribution could be practically the same as the particle size distribution of the input feed materials. In exemplary embodiments, the particle size distribution of the feed materials is maintained in the end products.

Within the plasma, the melted metals are inherently spheroidized due to liquid surface tension. As the microwave generated plasma exhibits a substantially uniform temperature profile, more than 90% spheroidization of particles could be achieved (e.g., 91%, 93%, 95%, 97%, 99%, 100%). After exiting the plasma, the particles are cooled before entering collection bins. When the collection bins fill, they can be removed and replaced with an empty bin as needed without stopping the process.

Figure 3:
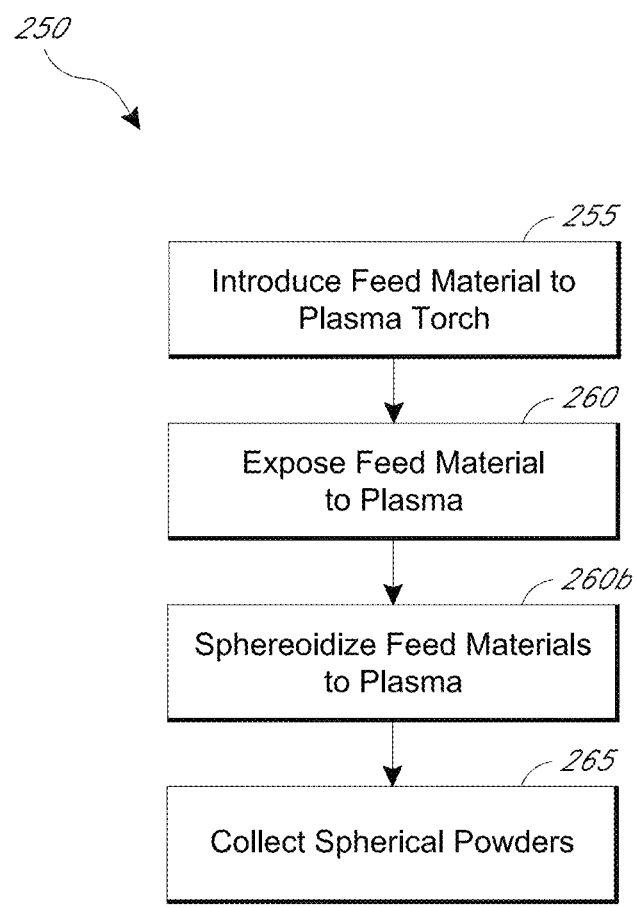
FIG. 3 illustrates an example embodiment of a method of producing powders according to the present disclosure.

FIG. 3 is a flow chart illustrating an exemplary method (250) for producing spherical powders, according to an embodiment of the present disclosure. In this embodiment, the process (250) begins by introducing a feed material into a plasma torch (255). In some embodiments, the plasma torch is a microwave generated plasma torch or an RF plasma torch. Within the plasma torch, the feed materials are exposed to a plasma causing the materials to melt, as described above (260). The melted materials are spheroidized by surface tension, as discussed above (260b). After exiting the plasma, the products cool and solidify, locking in the spherical shape and are then collected (265).

In some embodiments, the environment and/or sealing requirements of the bins are carefully controlled. That is, to prevent contamination or potential oxidation of the powders, the environment and or seals of the bins are tailored to the application. In one embodiment, the bins are under a vacuum. In one embodiment, the bins are hermetically sealed after being filled with powder generated in accordance with the present technology. In one embodiment, the bins are back filled with an inert gas, such as, for example argon. Because of the continuous nature of the process, once a bin is filled, it can be removed and replaced with an empty bin as needed without stopping the plasma process.

The methods and processes in accordance with the disclosure can be used to make powders, such as spherical powders.

In some embodiments, the processing discussed herein, such as the microwave plasma processing, can be controlled to prevent and/or minimize certain elements for escaping the feedstock during the melt, which can maintain the desired composition/microstructure.

Figure 4:
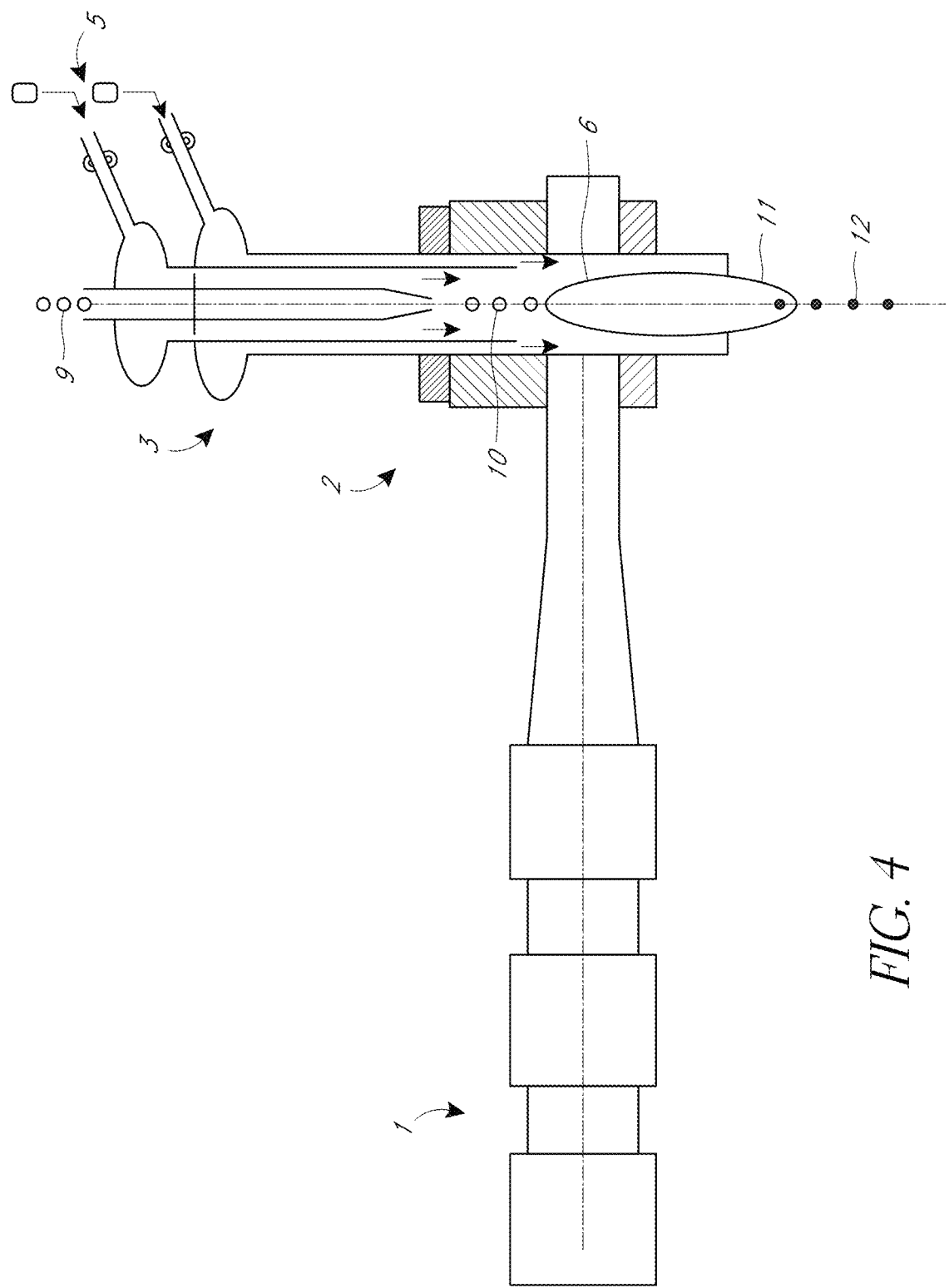
FIG. 4 illustrates an embodiment of a microwave plasma torch that can be used in the production of powders, according to embodiments of the present disclosure.

FIG. 4 illustrates an exemplary microwave plasma torch that can be used in the production of powders, according to embodiments of the present disclosure. As discussed above, feed materials 9, 10 can be introduced into a microwave plasma torch 3, which sustains a microwave generated plasma 11. In one example embodiment, an entrainment gas flow and a sheath flow (downward arrows) may be injected through inlets 5 to create flow conditions within the plasma torch prior to ignition of the plasma 11 via microwave radiation source 1.

In some embodiments, the entrainment flow and sheath flow are both axis-symmetric and laminar, while in other embodiments the gas flows are swirling. The feed materials 9 are introduced axially into the microwave plasma torch, where they are entrained by a gas flow that directs the materials toward the plasma. As discussed above, the gas flows can consist of a noble gas column of the periodic table, such as helium, neon, argon, etc. Within the microwave generated plasma, the feed materials are melted in order to spheroidize the materials. Inlets 5 can be used to introduce process gases to entrain and accelerate particles 9, 10 along axis 12 towards plasma 11. First, particles 9 are accelerated by entrainment using a core laminar gas flow (upper set of arrows) created through an annular gap within the plasma torch. A second laminar flow (lower set of arrows) can be created through a second annular gap to provide laminar sheathing for the inside wall of dielectric torch 3 to protect it from melting due to heat radiation from plasma 11. In exemplary embodiments, the laminar flows direct particles 9, 10 toward the plasma 11 along a path as close as possible to axis 12, exposing them to a substantially uniform temperature within the plasma.

In some embodiments, suitable flow conditions are present to keep particles 10 from reaching the inner wall of the plasma torch 3 where plasma attachment could take place. Particles 9, 10 are guided by the gas flows towards microwave plasma 11 were each undergoes homogeneous thermal treatment. Various parameters of the microwave generated plasma, as well as particle parameters, may be adjusted in order to achieve desired results. These parameters may include microwave power, feed material size, feed material insertion rate, gas flow rates, plasma temperature, residence time and cooling rates. In some embodiments, the cooling or quenching rate is not less than $10^{+3}$ degrees C./sec upon exiting plasma 11. As discussed above, in this particular embodiment, the gas flows are laminar; however, in alternative embodiments, swirl flows or turbulent flows may be used to direct the feed materials toward the plasma.

Figure 5A:
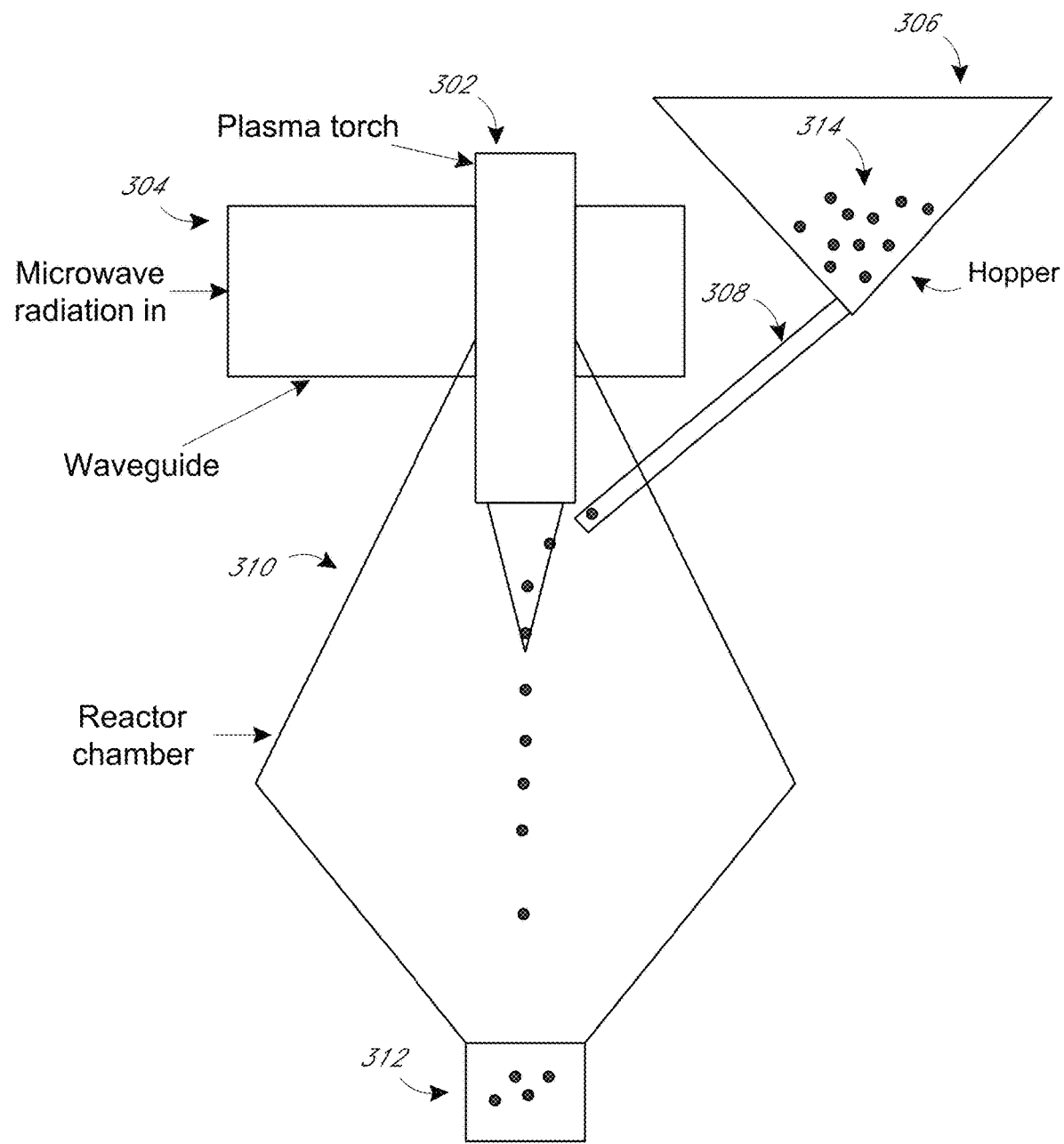
FIGS. 5A-5B illustrate embodiments of a microwave plasma torch that can be used in the production of powders, according to a side feeding hopper embodiment of the present disclosure.
Figure 5B:
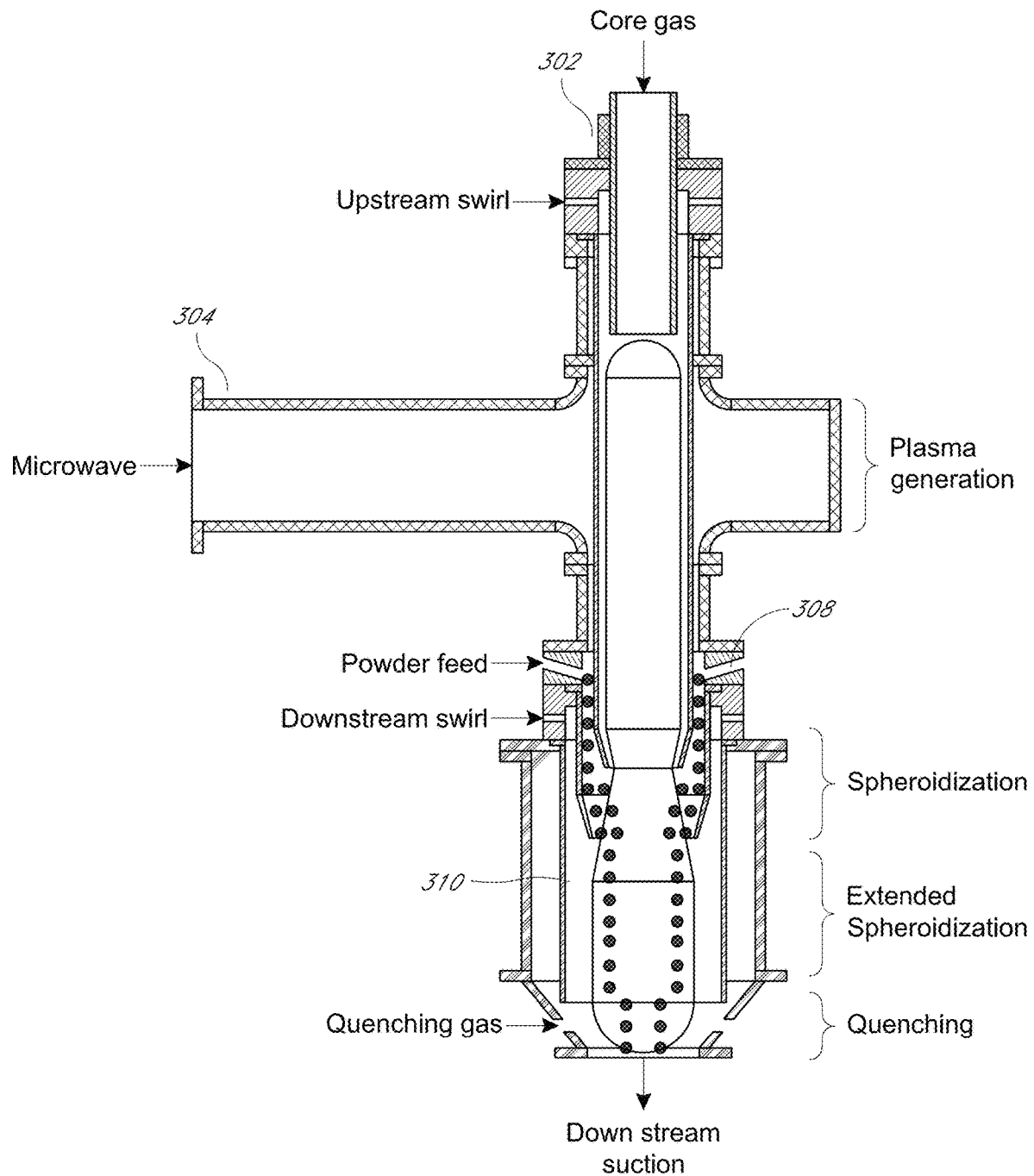

FIGS. 5A-B illustrates an exemplary microwave plasma torch that includes a side feeding hopper rather than the top feeding hopper shown in the embodiment of FIG. 4, thus allowing for downstream feeding. Thus, in this implementation the feedstock is injected after the microwave plasma torch applicator for processing in the "plume" or "exhaust" of the microwave plasma torch. Thus, the plasma of the microwave plasma torch is engaged at the exit end of the plasma torch to allow downstream feeding of the feedstock, as opposed to the top-feeding (or upstream feeding) discussed with respect to FIG. 4. This downstream feeding can advantageously extend the lifetime of the torch as the hot zone is preserved indefinitely from any material deposits on the walls of the hot zone liner. Furthermore, it allows engaging the plasma plume downstream at temperature suitable for optimal melting of powders through precise targeting of temperature level and residence time. For example, there is the ability to dial the length of the plume using microwave powder, gas flows, and pressure in the quenching vessel that contains the plasma plume.

Generally, the downstream spheroidization method can utilize two main hardware configurations to establish a stable plasma plume which are: annular torch, such as described in U.S. Pat. Pub. No. 2018/0297122, or swirl torches described in U.S. Pat. Nos. 8,748,785 B2 and 9,932,673 B2. Both FIG. 5A and FIG. 5B show embodiments of a method that can be implemented with either an annular torch or a swirl torch. A feed system close-coupled with the plasma plume at the exit of the plasma torch is used to feed powder axisymmetrically to preserve process homogeneity.

Other feeding configurations may include one or several individual feeding nozzles surrounding the plasma plume. The feedstock powder can enter the plasma at a point from any direction and can be fed in from any direction, 360° around the plasma, into the point within the plasma. The feedstock powder can enter the plasma at a specific position along the length of the plasma plume where a specific temperature has been measured and a residence time estimated for sufficient melting of the particles. The melted particles exit the plasma into a sealed chamber where they are quenched then collected.

The feed materials 314 can be introduced into a microwave plasma torch 302. A hopper 306 can be used to store the feed material 314 before feeding the feed material 314 into the microwave plasma torch 302, plume, or exhaust. The feed material 314 can be injected at any angle to the longitudinal direction of the plasma torch 302. 5, 10, 15, 20, 25, 30, 35, 40, 45, 50, or 55 degrees. In some embodiments, the feedstock can be injected an angle of greater than 5, 10, 15, 20, 25, 30, 35, 40, 45, 50, or 55 degrees. In some embodiments, the feedstock can be injected an angle of less than 5, 10, 15, 20, 25, 30, 35, 40, 45, 50, or 55 degrees. In alternative embodiments, the feedstock can be injected along the longitudinal axis of the plasma torch.

The microwave radiation can be brought into the plasma torch through a waveguide 304. The feed material 314 is fed into a plasma chamber 310 and is placed into contact with the plasma generated by the plasma torch 302. When in contact with the plasma, plasma plume, or plasma exhaust, the feed material melts. While still in the plasma chamber 310, the feed material 314 cools and solidifies before being collected into a container 312. Alternatively, the feed material 314 can exit the plasma chamber 310 while still in a melted phase and cool and solidify outside the plasma chamber. In some embodiments, a quenching chamber may be used, which may or may not use positive pressure. While described separately from FIG. 4, the embodiments of FIGS. 5A-5B are understood to use similar features and conditions to the embodiment of FIG. 4.

In some embodiments, implementation of the downstream injection method may use a downstream swirl, extended spheroidization, or quenching. A downstream swirl refers to an additional swirl component that can be introduced downstream from the plasma torch to keep the powder from the walls of the tube. An extended spheroidization refers to an extended plasma chamber to give the powder longer residence time. In some implementations, it may not use a downstream swirl, extended spheroidization, or quenching. In some embodiments, it may use one of a downstream swirl, extended spheroidization, or quenching. In some embodiments, it may use two of a downstream swirl, extended spheroidization, or quenching.

Injection of powder from below may result in the reduction or elimination of plasma-tube coating in the microwave region. When the coating becomes too substantial, the microwave energy is shielded from entering the plasma hot zone and the plasma coupling is reduced. At times, the plasma may even extinguish and become unstable. Decrease of plasma intensity means decreases in spheroidization level of the powder. Thus, by feeding feedstock below the microwave region and engaging the plasma plume at the exit of the plasma torch, coating in this region is eliminated and the microwave powder to plasma coupling remains constant through the process allowing adequate spheroidization.

Thus, advantageously the downstream approach may allow for the method to run for long durations as the coating issue is reduced. Further, the downstream approach allows for the ability to inject more powder as there is no need to minimize coating.

From the foregoing description, it will be appreciated that inventive processing methods for mechanically alloyed and/or HEA powder are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally", and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A method for manufacturing a spheroidized powder from a mechanically alloyed feedstock, the method comprising:
   introducing a mechanically alloyed feedstock into a microwave plasma torch, a plasma plume of the microwave plasma torch, and/or an exhaust of the microwave plasma torch, the mechanically alloyed feedstock prepared by milling a plurality of elemental powders or pre-alloyed powders; and
   contacting the mechanically alloyed feedstock with a plasma within the microwave plasma torch, the plasma plume of the microwave plasma torch, and/or the exhaust of the microwave plasma torch to form spheroidized powder, and
   wherein the mechanically alloyed feedstock comprises TiZrNbTaFe, AlFeVSi, FeCoNiCrTi, FeCoNiCrAl, or FeCoNiCrCu.

2. The method of claim 1, wherein the mechanically alloyed feedstock is milled by ball milling.

3. The method of claim 1, wherein the mechanically alloyed feedstock comprises a microstructure, and wherein the spheroidized powder maintains the microstructure.

4. The method of claim 1, further comprising varying one or more of the following parameters after introducing the mechanically alloyed feedstock into the microwave plasma torch, the plasma plume of the microwave plasma torch, and/or the exhaust of the microwave plasma torch: microwave power, plasma gas flow, gas type, plasma plume length, plasma plume diameter, plasma jet velocity, exhaust chamber pressure, quench gas type, exhaust gas velocity, feedstock velocity, feed gas flow, and feedstock feed rate.

5. The method of claim 1, wherein the plurality of elemental powders or pre-alloyed powders are mechanically milled for between about 1 hour and about 17 hours.

6. The method of claim 1, wherein the mechanically alloyed feedstock comprises a high entropy alloy.

7. The method of claim 1, wherein the mechanically alloyed feedstock comprises a non-equiatomic high entropy alloy.

8. The method of claim 1, wherein the spheroidized powder comprises a sphericity greater than 0.5.

9. The method of claim 1, wherein the spheroidized powder comprises a sphericity greater than 0.75.

10. The method of claim 1, wherein the spheroidized powder comprises a sphericity greater than 0.9.

11. The method of claim 1, wherein the spheroidized powder comprises a sphericity greater than 0.99.

12. A method for manufacturing a spheroidized powder from a mechanically alloyed feedstock, the method comprising:
- introducing a mechanically alloyed feedstock into a microwave plasma torch, a plasma plume of the microwave plasma torch, and/or an exhaust of the microwave plasma torch, the mechanically alloyed feedstock prepared by milling one or more powders to form an alloy comprising an entropy of mixing of greater than about 1.67R; and
- contacting the mechanically alloyed feedstock with a plasma within the microwave plasma torch, the plasma plume of the microwave plasma torch, and/or the exhaust of the microwave plasma torch to form spheroidized powder, and
- wherein the mechanically alloyed feedstock comprises TiZrNbTaFe, AlFeVSi, FeCoNiCrTi, FeCoNiCrAl, or FeCoNiCrCu.

13. The method of claim 12, wherein the mechanically alloyed feedstock is mechanically milled by ball milling.

14. The method of claim 12, wherein the alloy comprises a non-equiatomic high entropy alloy.

15. The method of claim 12, further comprising varying one or more of the following parameters after introducing the mechanically alloyed feedstock into the microwave plasma torch, the plasma plume of the microwave plasma torch, and/or the exhaust of the microwave plasma torch: microwave power, plasma gas flow, gas type, plasma plume length, plasma plume diameter, plasma jet velocity, exhaust chamber pressure, quench gas type, exhaust gas velocity, feedstock velocity, feed gas flow, and feedstock feed rate.

16. The method of claim 12, wherein the one or more powders are mechanically milled for between about 1 hour and about 17 hours.

17. The method of claim 12, wherein the spheroidized powder comprises a sphericity greater than 0.5.

18. The method of claim 12, wherein the spheroidized powder comprises a sphericity greater than 0.75.

19. The method of claim 12, wherein the spheroidized powder comprises a sphericity greater than 0.9.

20. The method of claim 12, wherein the spheroidized powder comprises a sphericity greater than 0.99.

* * * * *